(12) United States Patent
Kakihara

(10) Patent No.: US 6,614,629 B1
(45) Date of Patent: Sep. 2, 2003

(54) THIN FILM MAGNETIC HEAD PROVIDING AN ESSENTIALLY WARP-FREE UPPER SHIELD LAYER AND FLOATING MAGNETIC HEAD USING THE SAME

(75) Inventor: Yoshihiko Kakihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 198 days.

(21) Appl. No.: 09/626,475

(22) Filed: Jul. 26, 2000

(30) Foreign Application Priority Data

Jul. 26, 1999 (JP) .......................................... 11-211391

(51) Int. Cl.[7] ................................................ G11B 5/39
(52) U.S. Cl. ..................................... 360/324.1; 360/319
(58) Field of Search .................. 360/319, 324.1–324.12

(56) References Cited

U.S. PATENT DOCUMENTS

| | | |
|---|---|---|
| 5,206,590 A | 4/1993 | Dieny et al. |
| 5,583,725 A | 12/1996 | Coffey et al. |
| 5,972,420 A | 10/1999 | Saito et al. |
| 6,337,784 B2 * | 1/2002 | Narumi et al. .............. 360/319 |
| 6,434,814 B1 * | 8/2002 | Chang et al. ................ 360/319 |

* cited by examiner

Primary Examiner—Robert S. Tupper
(74) Attorney, Agent, or Firm—Brinks Hofer Gilson & Lione

(57) ABSTRACT

The present invention provides a thin film magnetic head which is prevented from producing a great step in an upper shield layer and which can decrease the probability of a short circuit between the upper shield layer or lower shield layer and a spin-valve thin film magnetic element. The thin film magnetic head includes a spin-valve thin film magnetic element including a lamination of a free magnetic layer, a nonmagnetic conductive layer, a pinned magnetic layer, and an antiferromagnetic layer, a pair of conductive layers for supplying a sensing current to the free magnetic layer, and a pair of insulating bias layers for orienting the magnetization direction of the free magnetic layer; and a pair of shield layers laminated on both sides of the spin-valve thin film magnetic element in the direction of the thickness thereof. The thin film magnetic head also has a projection formed on one of the shield layers to project toward the spin-valve thin film magnetic element side so that the pair of insulating bias layers are arranged on both sides of the projection in the direction of the track width.

7 Claims, 15 Drawing Sheets

THIN FILM MAGNETIC HEAD PROVIDING AN ESSENTIALLY WARP-FREE UPPER SHIELD LAYER AND FLOATING MAGNETIC HEAD USING THE SAME

BACKGROUND OF THE INVENTION

1. Field of the Invention

The present invention relates to a thin film magnetic head. More particularly, the present invention relates to a floating magnetic head having the thin film magnetic head.

2. Description of the Related Art

Magnetoresistive thin film magnetic heads include AMR (Anisotrophic Magnetoresistive) and GMR (Giant Magnetoresistive) heads. An AMR head has an element exhibiting a magnetoresistive effect. A GMR head has an element exhibiting a giant magnetoresistive effect.

In a GMR head, the element exhibiting the giant magnetoresistive effect has a multilayer structure. Among several types of multilayer structures creating the giant magnetoresistive effect, a relatively simple structure exhibiting a high rate of change in resistance with an external magnetic field is the structure of a spin-valve thin film magnetic element. This structure has at least a free magnetic layer, a pinned magnetic layer, and a nonmagnetic layer. Such spin-valve thin film magnetic elements include single and dual spin-valve thin film magnetic elements.

In addition, there are different systems for orienting the magnetization direction of the free magnetic layer including hard and exchange bias systems. In recent years, the exchange bias system has become more widely used because it is adaptable to the track narrowing associated with increases in magnetic recording density.

FIG. 31 shows a thin film magnetic head 501 comprising an exchange bias system.

FIG. 32 shows the structure of a principal portion of a floating magnetic head 500 comprising the thin film magnetic head 501 shown in FIG. 31 and a write inductive head 503, as viewed from the surface facing a medium.

The floating magnetic head 500 comprises the thin film magnetic head 501 and the inductive head 503, which are laminated on the trailing end 504a of a floating slider 504.

The thin film magnetic head 501 is a reproduction-only magnetic head, and comprises a pair of shield layers 507 and 508 laminated on both sides of a spin-valve thin film magnetic element 502 in the direction of the thickness. Insulating layers 505 and 506 are provided between the spin valve thin film magnetic element 502, and the shield layers 507, 508 respectively.

In FIGS. 31 and 32, the Z direction is the movement direction of a magnetic recording medium. The Y direction is the direction of a leakage magnetic field from the magnetic recording medium. The X1 direction is the direction of the track width of the thin film magnetic head 501 and the inductive head 503.

As shown in FIG. 32, the floating magnetic head 500 comprises an insulating layer 509 laminated on the trailing side end 504a of the floating slider 504. The lower shield layer 508, the spin-valve thin film magnetic element 502, the upper shield layer 507, a gap layer 510, and an upper core layer 511, are laminated in turn on the insulating layer 509.

As shown in FIG. 32, the thin film magnetic head 501 comprises the spin-valve thin film magnetic element 502, and the shield layers 507 and 508. The inductive head 503 comprises the lower core layer (upper shield layer) 507, the gap layer 510 and the upper core layer 511.

In the inductive head 503, the upper and lower core layers 511 and 507 are arranged opposite to each other with the gap layer 510 provided therebetween to form a write magnetic gap G1.

The upper shield layer 507 is also the lower core layer of the inductive head 503.

The spin-valve thin film magnetic element 502 is a bottom-type single spin-valve thin film element comprising an antiferromagnetic layer, a pinned magnetic layer, a nonmagnetic conductive layer, and a free magnetic layer, which are laminated in turn.

In the spin-valve thin film magnetic element 502, the insulating layer 506 is made of $Al_2O_3$ and is laminated on the lower shield layer 508. An antiferromagnetic layer 512, a pinned magnetic layer 513, a nonmagnetic conductive layer 514 made of Cu or the like, and a free magnetic layer 515 are laminated in turn on the insulating layer 506.

A pair of bias layers 516 are laminated on the free magnetic layer 515 with a pair of ferromagnetic layers 518 provided therebetween. The ferromagnetic layers 518 are made of, for example, a NiFe alloy and are spaced along the X1 direction shown in FIG. 31.

A pair of conductive layers 517 made of Cu are laminated on the bias layers. An insulating layer 505 made of $Al_2O_3$ is laminated to cover the conductive layers 517 and the free magnetic layer 505. The upper shield layer 507 is laminated on the insulating layer 515.

The antiferromagnetic layer 512 comprises an antiferromagnetic material such as a PtMn alloy, or the like. The antiferromagnetic layer 512 is laminated in contact with the pinned magnetic layer 513 so that an exchange coupling magnetic field (exchange anisotropic magnetic field) is exhibited in the interface between the pinned magnetic layer 513 and the antiferromagnetic layer 512. The magnetization direction of the pinned magnetic layer 513 is pinned in the Y direction as shown in the drawings.

Each of the bias layers 516 is made of an antiferromagnetic material such as an IrMn alloy or the like. The bias layers 516 are laminated in contact with the ferromagnetic layers 518 so that an exchange coupling magnetic field (exchange anisotropic magnetic field) is exhibited in each of the interfaces between the bias layers 516 and the ferromagnetic layers. The magnetization direction of the free magnetic layer 515 is oriented in the X1 direction shown in the drawings by the exchange coupling magnetic field. As a result, the free magnetic layer 515 is put into a single magnetic domain state to suppress Barkhausen noise.

Therefore, the magnetization direction of the free magnetic layer 515 crosses the magnetization direction of the pinned magnetic layer 513.

In addition, the pair of bias layers 516 are laminated with a space therebetween to produce a portion where the bias layers 516 are not laminated on the free magnetic layer 515. This portion serves as a track portion G2 of the thin film magnetic head 501.

In the thin film magnetic head 501, the magnetization direction of the free magnetic layer 515 is oriented in the X1 direction and changes with a leakage magnetic field from a recording medium such as a hard disk. The magnetization of the pinned magnetic layer 513 is pinned in the Y direction as shown in the drawings. Accordingly, the changing orientation of the free magnetic layer 515 changes the electric resistance of the spin-valve thin film magnetic element. The voltage changes based on the change in the electric resistance, thus detecting the leakage magnetic field from the recording medium.

In the conventional thin film magnetic head 501, as shown in FIG. 31, the pair of bias layers 516 and the conductive layers 517 are laminated on the free magnetic 515. A step 505a occurs in the insulating layer 505 near the write track portion G2. This step 505a is patterned by the gap layer 510 through the upper shield layer 507 to warp the shape of the write magnetic gap G1 of the inductive head 503, as shown in FIG. 32. Consequently, a magnetic recording pattern recorded on the magnetic recording medium is also warped, thus causing potential errors during reproduction.

In manufacturing the floating magnetic head 500, a plurality of thin film magnetic heads 501 and inductive heads 503 are formed on a substrate by a thin film deposition technique. The substrate is cut. To determine the gap depth, the medium-facing surface must be polished with a grinding stone or the like. Namely, the surface of the drawing of FIG. 32 is the polished surface.

In the conventional thin film magnetic head 501, smearing occurs during polishing. The grind stone causes small portions of the polished surfaces of the shield layers 507 and 508 which are made of metal, to extend on the polished surfaces. The extended portions of the shield layers 507, 508 cause tongue-like sags 507a and 508a. The tongue-like sags 507a and 508a cross the insulating layers 505, 506 and reach the free magnetic layer 515, the antiferromagnetic layer 512, or the bias layers 516. This bridging causes a short circuit between the shield layers 507 and 508 and the spin-valve thin film magnetic element 502.

Particularly, there is a recent tendency to further thin the insulating layers 505 and 506 due to a need to narrow the gap length between the upper and lower shield layers 507 and 508—to comply with an increase in magnetic recording density. In this case, even when a little sag occurs, the sag readily reaches the antiferromagnetic layer and other layers. Consequently, the probability increases for a short-circuit between the shield layers 507 and 508 and the spin-valve thin film magnetic element 502.

In addition, the bias layers 516 and the conductive layers 517 are formed by a lift-off method. The bias layers 516 must be formed to a thickness of about 500 Å to securely orient the magnetization direction of the free magnetic layer 515. The conductive layers 517 must be formed to some thickness in order to flow a sensing current. In forming the bias layers 516 and the conductive layers 517 by the lift-off method, the incidence of burrs increases. As shown in FIG. 31, the burrs 519 contact the shield layer 507 through the insulating layer 505. This contact increases the probability of a short circuit between the shield layer 507 and the spin-valve thin film magnetic element 502.

Furthermore, each of the bias layers 516 is made of an antiferromagnetic material frequently having high resistivity. The conductive layers 517 are formed on the material having high resistivity. As a result, the sensing current cannot be efficiently applied to the free magnetic layer 515.

SUMMARY OF THE INVENTION

The present invention has been achieved for solving the above problems. An object of the present invention is to provide a thin film magnetic head with an essentially warp-free upper shield layer (the thin film magnetic head can be prevented from producing a great step in an upper shield layer). This prevents the occurrence of errors in magnetic recording by decreasing the warping of an inductive head formed on the upper shield layer. Another object is to improve yield by decreasing the probability of a short circuit between the upper or lower shield layers and the spin-valve thin film magnetic element. A further object of the present invention is to provide a floating magnetic head comprising the thin film magnetic head. In order to achieve these objects, the present invention uses the following construction.

A thin film magnetic head of the present invention has a spin-valve thin film magnetic element and a pair of shield layers laminated on both sides of the spin-valve thin film magnetic element in the direction of the thickness. The spin-valve thin film magnetic element has a lamination of a free magnetic layer, a nonmagnetic conductive layer, a pinned magnetic layer, an antiferromagnetic layer for pinning the magnetization direction of the pinned magnetic layer, a pair of conductive layers for supplying a sensing current to the free magnetic layer, and a pair of insulating bias layers for orienting the magnetization direction of the free magnetic layer. A projection is formed on one of the shield layers to project toward the spin-valve thin film magnetic element side. The pair of insulating bias layers are arranged on both sides of the projection in the direction of the track width.

The insulating bias layers are preferably provided between one of the shield layers and the free magnetic layer or the conductive layers.

In the thin film magnetic head, the pair of the insulating bias layers are arranged on both sides of the projection of one of the shield layers in the direction of the track width. The pair of insulating bias layers are partly or wholly buried in the one shield layer.

Therefore, a step produced on the side of the spin-valve thin film magnetic element, which contacts the other shield layer, can be decreased to prevent the propagation of the step to the other shield layer. For example, even when a gap layer and an upper core layer are laminated on the other shield layer to form an inductive head, no step occurs in the gap layer, thereby preventing the shape of a write magnetic gap from being warped.

In addition, since the pair of insulating bias layers are partly or wholly buried in one of the shield layers, even when the spin-valve thin film magnetic element is thinned to narrow the gap with increases in magnetic recording density, the insulating layers need not be thinned, and the magnetization direction of the free magnetic layer can securely be oriented in one direction.

Furthermore, the insulating bias layers having high insulation are laminated on one of the shielding layers. Even when the shield layers are partially extended to cause a sag in polishing the medium-facing surface for determining the gap depth, there is low probability the sag will reach the free magnetic layer across the insulating bias layers. Hence, there is a lower probability of a short circuit between one of the shield layers and the spin-valve thin film magnetic element.

In the thin film magnetic head of the present invention, preferably, an insulating layer is laminated at least on the projection. The surface of the insulating layer and the surfaces of the pair of insulating bias layers lie in the same plane. Accordingly, the free magnetic layer is laminated on the same plane.

In the thin film magnetic head, the insulating layer and the pair of the insulating bias layers form the same plane. Hence, a free magnetic layer is laminated on the same plane, thereby causing no step in the free magnetic layer.

In addition, since the free magnetic layer contacts the insulating bias layers, an exchange coupling magnetic field (exchange anisotropic magnetic field) is exhibited in each of the interfaces between these layers. The magnetization direction of the free magnetic layer is oriented in the direction of the track width by the exchange coupling magnetic field.

Therefore, in the thin film magnetic head, the magnetization direction of the free magnetic layer can be securely oriented in the direction of the track width to decrease Barkhausen noise.

The thin film magnetic head of the present invention further comprises a pair of ferromagnetic layers that are located on both sides of the free magnetic layer in the direction of the track width. The ferromagnetic layers are laminated on the pair of the insulating bias layers to exhibit an exchange anisotropic magnetic field so that the magnetization direction of the free magnetic layer is oriented by the exchange anisotropic magnetic field.

In manufacturing the thin film magnetic head, the insulating bias layers and the ferromagnetic layers are laminated in turn, thereby preventing impurity contamination of the interfaces therebetween. Also, the great exchange coupling magnetic field is exhibited in the interfaces between the insulating bias layers and the ferromagnetic layers. Hence, the magnetization direction of the free magnetic layer can be securely oriented in the direction of the track width by the exchange coupling magnetic field.

In addition, the insulating bias layers are provided between one of the shield layers and the ferromagnetic layers. Even when the shielding layers are partially extended to cause a sag during polishing of the medium-facing surface for determining the gap depth, there is a lower probability that the sag reaches the ferromagnetic layers across the insulating bias layers. Hence, there is lower probability of a short circuit between the shield layers and the spin-valve thin film magnetic element.

Furthermore, in the thin film magnetic head of the present invention, another projection is formed in the other shield layer to project toward the spin-valve thin film magnetic element side. The pair of the conductive layers are provided on both sides of the other projection in the direction of the track width.

Insulating layers are preferably provided between the conductive layers and the shield layers.

In the thin film magnetic head, the pair of conductive layers are provided on both sides of the other projection of the other shield layer. The pair of conductive layers are partly or wholly buried in the other shield layer through the insulating layer.

Therefore, even when the spin-valve thin film magnetic element is thinned to narrow the gap with increases in magnetic recording density, the conductive layers need not be thinned. Accordingly, the sensing current can be efficiently supplied to the free magnetic layer.

The thin film magnetic head of the present invention is characterized in that the pair of the conductive layers are spaced in the direction of the track width in contact with the free magnetic layer.

In the thin film magnetic head, the pair of the conductive layers are in contact with the free magnetic layer. Hence, the sensing current can be efficiently supplied to the free magnetic layer.

In accordance with another embodiment of the present invention, a thin film magnetic head comprises a spin-valve thin film magnetic element and a pair of shield layers laminated on both sides of the spin-valve thin film magnetic element in the thickness direction. The spin-valve thin film magnetic element has a nonmagnetic conductive layer, a pinned magnetic layer, and an antiferromagnetic layer, which are laminated on either side of a free magnetic layer in the thickness direction. The spin valve thin film magnetic element also has a pair of conductive layers for supplying a sensing current to the free magnetic layer and a pair of insulating bias layers for orienting the magnetization direction of the free magnetic layer. A projection is formed in one of the shield layers to project toward the spin-valve thin film magnetic element side so that the pair of insulating bias layers are arranged on both side of the projection in the direction of the track width.

The insulating bias layers are preferably provided between the one shield layer and the free magnetic layer or the conductive layers.

In this thin film magnetic head, the pair of the insulating bias layers are arranged on both sides of the projection of the one shield layer so that the pair of the insulating bias layers are partly or wholly buried in the one shield layer.

It is thus possible to decrease a step produced on the surface of the spin-valve thin film magnetic element, which contacts the other shield layer, thereby preventing the propagation of the step to the other shield layer. For example, even when a gap layer and an upper core layer are laminated on the other shield layer to form an inductive head, no step occurs in the gap layer. The shape of the write magnetic gap is not warped.

Since the pair of the insulating bias layers are partly or wholly buried in the one shield layer, even in a case in which the space between the spin-valve thin film magnetic element and the shield layers is decreased to narrow the gap with increases in the magnetic recording density, the insulating bias layers need not be thinned. No loss occurs in the bias magnetic field. Therefore, the magnetization direction of the free magnetic layer can be securely oriented in one direction.

In addition, the insulating bias layers having high insulation are laminated on one of the shielding layers. Even when the shield layers are partially extended to cause a sag in polishing the medium-facing surface for determining the gap depth, the probability of a short circuit between the shield layers and the spin-valve thin film magnetic element can be decreased because the shield layers are insulated by the insulating bias layers.

The thin film magnetic head of the present invention further comprises a pair of ferromagnetic layers that are located on both sides of the free magnetic layer in the direction of the track width. The ferromagnetic layers are laminated on the pair of the insulating bias layers to exhibit the exchange anisotropic magnetic field. The magnetization direction of the free magnetic layer is oriented by the exchange anisotropic magnetic field.

In manufacturing the thin film magnetic head, the insulating bias layers and the ferromagnetic layers are laminated in turn, thereby preventing impurity contamination of the interfaces therebetween. Also, the great exchange coupling magnetic field is exhibited in each of the interfaces between the insulating bias layers and the ferromagnetic layers so that the magnetization direction of the free magnetic layer can securely be oriented in the direction of the track width by the exchange coupling magnetic field.

In addition, the insulating bias layers are provided between one of the shield layers and the ferromagnetic layers. Even when the shielding layers are partially extended to cause a sag during polishing of the medium-facing surface for determining the gap depth, there is low probability that the sag reaches the ferromagnetic layers across the insulating bias layers, thereby decreasing the occurrence probability of a short circuit between the shield layers and the spin-valve thin film magnetic element.

In the thin film magnetic head of the present invention, preferably, an insulating layer is laminated on at least the projection. One of the antiferromagnetic layers, one of the pinned magnetic layers, and one of the nonmagnetic conductive layers are laminated on the insulating layer. The insulating bias layers are arranged on both sides of the projection, the one antiferromagnetic layer, the one pinned magnetic layer, and the one nonmagnetic conductive layer in the direction of the track width. Furthermore, the surface of the one nonmagnetic conductive layer and the surfaces of the pair of insulating bias layers lie in the same plane so that the free magnetic layer is laminated on the same plane.

In the thin film magnetic head, the insulating layer and the pair of the insulating bias layers form the same plane so that the free magnetic layer is laminated on the same plane, thereby causing no step in the free magnetic layer.

In addition, since the free magnetic layer contacts the insulating bias layers, an exchange coupling magnetic field (exchange anisotropic magnetic field) is exhibited in the interfaces between these layers. The magnetization direction of the free magnetic layer is oriented in the direction of the track width by the exchange coupling magnetic field.

Therefore, in the thin film magnetic head, the magnetization direction of the free magnetic layer can securely be oriented in the direction of the track width to decrease Barkhausen noise.

Furthermore, in the thin film magnetic head of the present invention, another projection is formed in the other shield layer to project toward the spin-valve thin film magnetic element side. The pair of the conductive layers are provided on both sides of the other projection in the direction of the track width.

Insulating layers are preferably provided between the conductive layers and the shield layers.

In the thin film magnetic head, the pair of the conductive layers are provided on both sides of the other projection of the other shield layer. The pair of the conductive layers are partly or wholly buried in the other shield layer through the insulating layer.

Therefore, even when the spin-valve thin film magnetic element is thinned to narrow the gap with increases in magnetic recording density, the conductive layers need not be thinned. The sensing current can be efficiently supplied to the free magnetic layer.

In the thin film magnetic head of the present invention, preferably, the other projection is formed in the other shield layer to project toward the spin-valve thin film magnetic element side. The other antiferromagnetic layer, the other pinned magnetic layer and the other nonmagnetic conductive layer are laminated on the other projection. In addition, the pair of the conductive layers are preferably arranged on both sides of the other projection, the other antiferromagnetic layer, the other pinned magnetic layer, and the other nonmagnetic conductive layer in the direction of the track width. The surface of the other nonmagnetic conductive layer and the surfaces of the pair of conductive layers preferably lie in the same plane so that the free magnetic layer is laminated on the same plane.

In the thin film magnetic head, the surface of the other nonmagnetic conductive layer and the surfaces of the pair of the conductive layers lie in the same plane so that the free magnetic layer is laminated on the same plane. Therefore, the conductive layers are brought into direct contact with the free magnetic layer to permit the efficient supply of the sensing current to the free magnetic layer from the conductive layers.

A floating magnetic head of the present invention comprises any one of the above-described magnetic heads provided on a slider.

DESCRIPTION OF THE PREFERRED EMBODIMENTS

Embodiments of the present invention are described below with reference to the drawings.

First Embodiment

Figure 1:
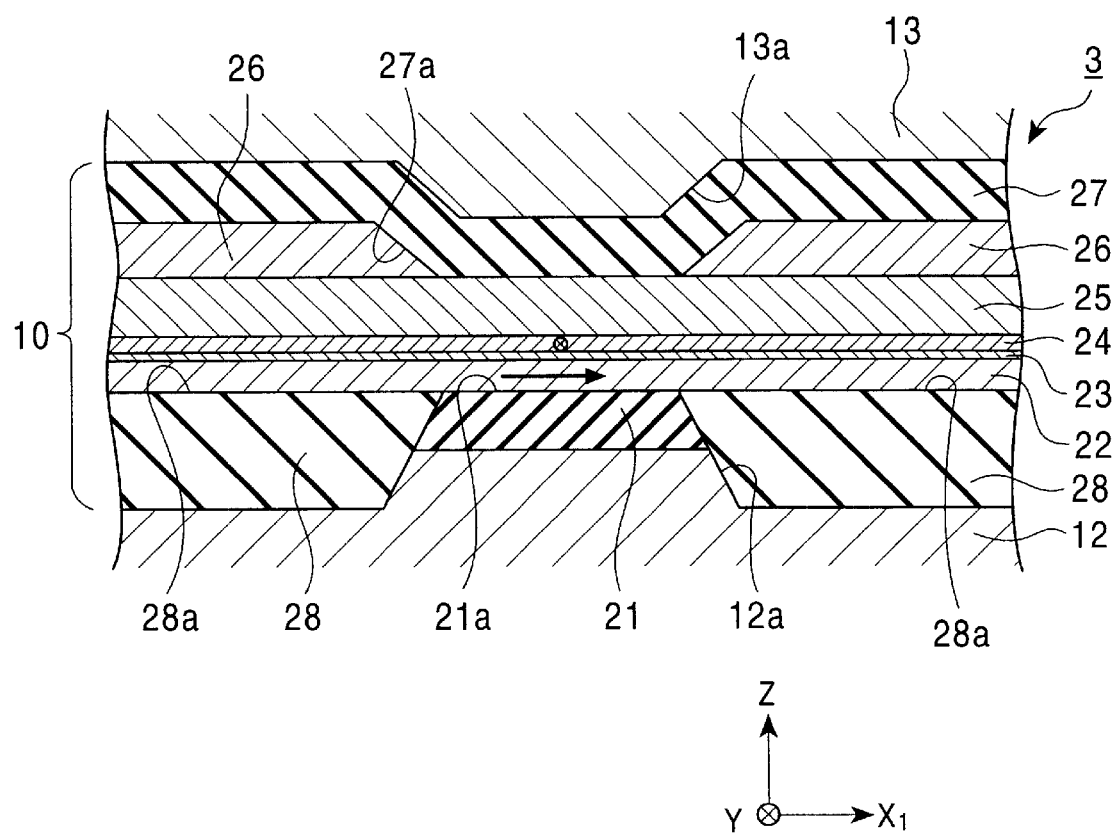
FIG. 1 is a sectional view of a thin film magnetic head in accordance with a first embodiment of the present invention, as viewed from the medium-facing surface side.
Figure 2:
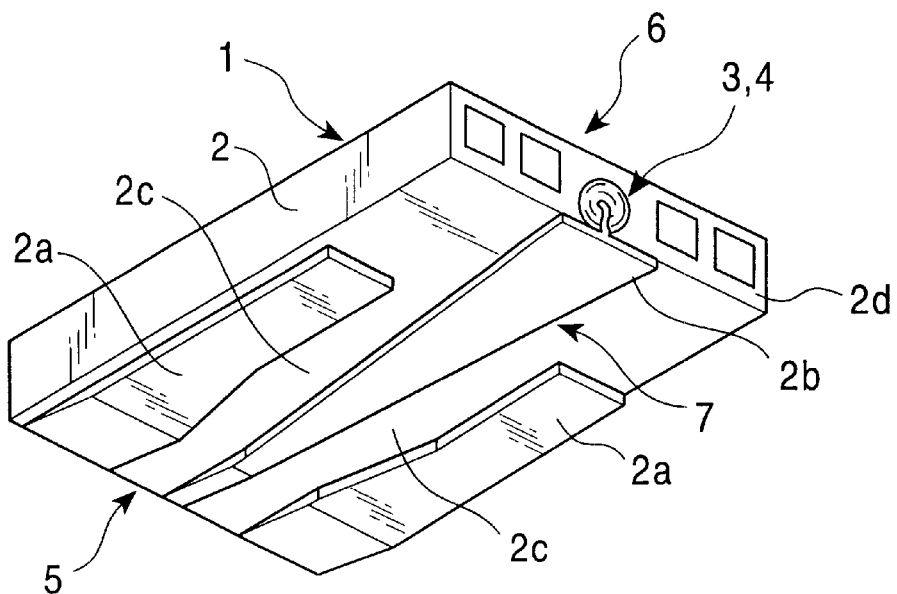
FIG. 2 is a perspective view showing a floating magnetic head in accordance with the first embodiment of the present invention.
Figure 3:
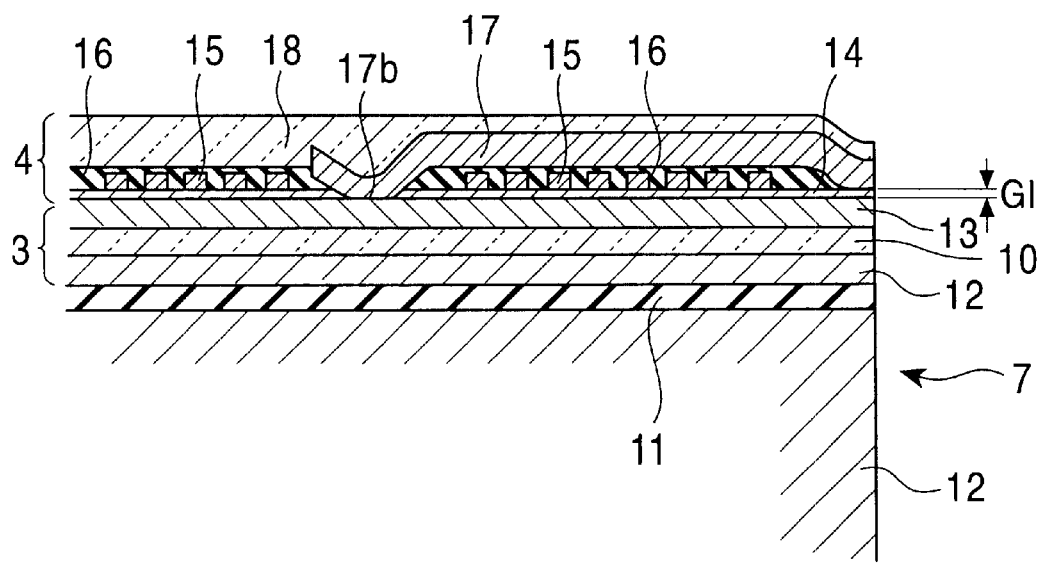
FIG. 3 is a sectional view showing a portion of the flowing magnetic head shown in FIG. 2.
Figure 4:
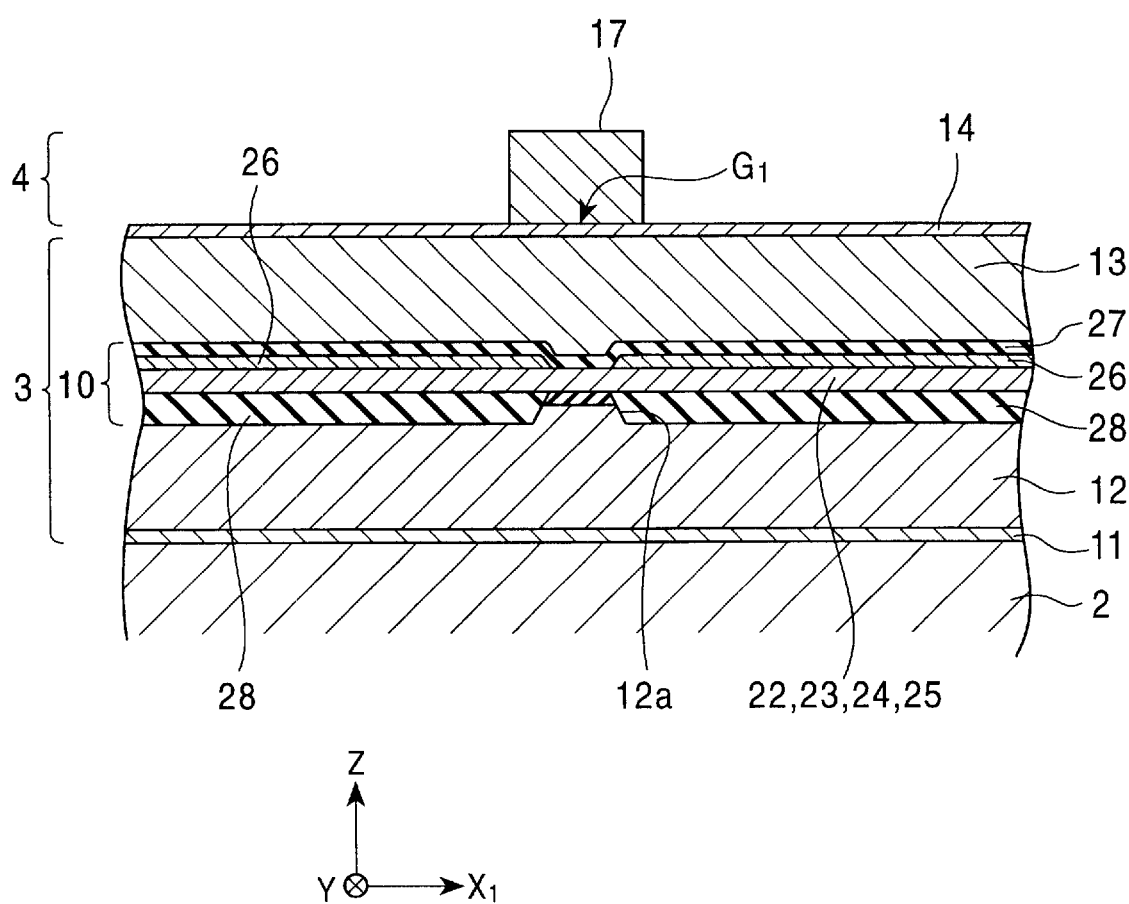
FIG. 4 is sectional view showing a portion of the floating magnetic head shown in FIG. 2, as viewed from the medium-facing surface side.

FIG. 1 is a sectional view of a thin film magnetic head in accordance with a first embodiment of the present invention. FIGS. 2, 3 and 4 show a floating magnetic head comprising the thin film magnetic head shown in FIG. 1.

The floating magnetic head 1 shown in FIG. 2 comprises a slider 2, a thin film magnetic head 3, and an inductive head 4. The thin film magnetic head 3 and inductive head 4 are provided on the end surface 2d of the slider 2. Slide 2 has a leading side 5 and a trailing side 6. The leading side 5 is on an upstream side in the movement direction of a magnetic recording medium. The trailing side 6 is on a downstream side. Rails 2a and 2b of the slide 2 are formed on the medium-facing surface. Air groups 2c are formed between the respective rails 2a and 2b.

As shown in FIGS. 3 and 4, the thin film magnetic head 3 of the present invention has an insulating layer 11 formed on the end surface 2d of the slider 2. A lower shield layer 12 is laminated on the insulating layer 11. A spin-valve thin film magnetic element 10 according to the present invention is formed on the lower shield layer 12. An upper shield layer 13 is formed to cover the spin-valve thin film magnetic element 10.

The upper shield layer 13 is used as a lower core layer of the inductive head 4, which will be described below.

The inductive head 4 comprises the lower core layer (upper shield layer) 13, a gap layer 14 laminated on the lower core layer 13, a coil 15, an upper insulating layer 16 formed to cover the coil 15, and an upper core layer 17 joined to the gap layer 14 and joined to the lower core layer 13 on the coil 15 side. The upper core layer 17 and the lower core layer 13 are arranged opposite to each other with the gap layer 14 provided therebetween. This portion serves as a write magnetic gap G1.

The coil 15 is patterned in a spiral planar shape. The base end 17b of the upper core layer 17 is magnetically connected to the lower core layer 13 at the substantially central portion of the coil 15.

Furthermore, a protecting layer 18 made of alumina is laminated on the upper core layer 17.

In FIGS. 1, 3 and 4, the Z direction is the movement direction of the magnetic recording medium. The Y direction is the direction of a leakage magnetic field from the magnetic recording medium. The X1 direction is the direction of the track width of the thin film magnetic head 3 and the inductive head 4.

As shown in FIG. 1, the thin film magnetic head 3 of the present invention comprises the spin-valve thin film magnetic element 10. The upper and lower shield layers 13 and 12 are laminated on both sides of the spin-valve thin film magnetic element 10 in the direction of the thickness thereof. Each of the upper and lower shield layers 13 and 12 is made of a magnetic alloy.

As shown in FIG. 1, a projection 12a is provided in the lower shield layer 12. The projection 12a projects toward the spin-valve thin film magnetic element 10. Another projection 13a is provided in the upper shield layer 13 and projects toward the spin-valve thin film magnetic element 10.

The spin-valve thin film magnetic element 10 is a top-type single spin valve thin film magnetic element. A free magnetic layer 22, a nonmagnetic conductive layer 23, a pinned magnetic layer 24, and an antiferromagnetic layer 25 are laminated in turn.

In the spin-valve thin film magnetic element 10, an insulating layer 21 is made of $Al_2O_3$ and is provided on the projection 12a of the lower shield layer 12. A pair of insulating bias layers 28 are arranged on both sides of the projection 12a and the insulating layer 21 in the X1 direction as shown in FIG. 1 (on both sides in the direction of the track width).

The insulating bias layers 28 are laminated to a thickness with which the upper surfaces 28a (layer surfaces) of the insulating bias layers 28 and the upper surface (layer surface) 21a of the insulating layer 21 form the same plane.

The pair of the insulating bias layers 28 are arranged on both sides of the projection 12a of the lower shield layer 12 in the X1 direction. The insulating layers 28 are partly buried in the lower shield layer 12.

Furthermore, a free magnetic layer 22 is laminated on the insulating bias layers 28 and the insulating layer 21. The free magnetic layer 22 is insulated from the lower shield layer 12 by the insulating layer 21 and the insulating bias layers 28.

The nonmagnetic conductive layer 23, the pinned magnetic layer 24, and the antiferromagnetic layer 25 are laminated in turn on the free magnetic layer 22.

Furthermore, a pair of conductive layers 26 are laminated on the antiferromagnetic layer 25 to be spaced along the X1 direction (the direction of the track width). The conductive layers 26 supply a sensing current to the free magnetic layer 22. An insulating layer 27 made of $Al_2O_3$ or the like is laminated to cover the conductive layers 26 and the antiferromagnetic layer 25.

The upper shield layer 13 is laminated on the insulating layer 27.

As shown in FIG. 1, the projection 27a of the insulating layer 27 and the projection 13a of the upper shield layer 13 are located between the pair of conductive layers 26. Namely, the conductive layers are located on both sides of the projection 13a of the upper shield layer 13 in the direction of the track width.

The insulating bias layers 28 are made of an insulating antiferromagnetic material. The insulating bias layers 28 are brought into contact with the free magnetic layer 22 so that an exchange coupling magnetic field (exchange anisotropic magnetic field) is exhibited in the interfaces between the insulating bias layers 28 and the free magnetic layer 22. The magnetization direction of the free magnetic layer 22 is oriented in the X1 direction shown in the drawing by the exchange coupling magnetic field. This orientation puts the free magnetic layer 22 in a single magnetic domain state, thereby suppressing Barkhausen noise.

The thickness of each of the insulating bias layers 28 is preferably in the range of 200 to 1000 Å, and more preferably in the range of 500 to 1000 Å, to securely orient the magnetization direction of the free magnetic layer 22 in the X1 direction.

When the insulating bias layers 28 have a thickness of less than 200 Å, the thickness in an insulating material provided in the spin-valve thin film magnetic element 10 is decreased. Consequently, there is a higher probability that the lower shield layer 12 will be partly extended to cause a sag during the polishing of the medium-facing surface in manufacturing floating magnetic head. There also is a higher probability the sag will reach the free magnetic layer 22 across the insulating bias layers 28. Therefore, the occurrence probability of a short circuit between the lower shield layer 12 and the spin-valve thin film magnetic element 10 is undesirably increased. The exchange coupling field for orienting the magnetization direction of the free magnetic layer 22 also is undesirably decreased.

The thickness of each of the insulating bias layers 28 is determined by adjusting the height of the projection 12a of the lower shield layer 12, and the thickness of the insulating layer 21.

Each of the insulating bias layers 28 is preferably made of an oxide insulating antiferromagnetic material such as NiO, $\alpha$-$Fe_2O_3$, or the like, and more preferably NiO.

The antiferromagnetic layer 25 is made of an antiferromagnetic material, and laminated on the pinned magnetic layer 24 to exhibit the exchange coupling magnetic field (exchange anisotropic magnetic field) in the interface between the pinned magnetic layer 24 and the antiferromagnetic layer 25. The magnetization direction of the pinned magnetic layer 24 is pinned in the Y direction as shown in the drawing. As a result, the magnetization direction of the free magnetic layer 22 crosses the magnetization direction of the pinned magnetic layer 24.

The antiferromagnetic layer 25 is preferably made of a conductive material. If the antiferromagnetic layer 25 made of an insulating material, the sensing current cannot be supplied to the free magnetic layer 22 from the conductive layers 26.

The antiferromagnetic layer 25 is preferably made of a PtMn alloy. PtMn alloys have excellent corrosion resistance as compared with the NiMn and FeMn alloys conventionally used for antiferromagnetic layers. PtMn alloys also have a high blocking temperature and a high exchange coupling magnetic field.

In place of the PtMn alloy, the antiferromagnetic layer 25 may be made of an alloy represented by X—Mn, wherein X represents one element selected from Pd, Ru, Ir, Rh, and Os. The antiferromagnetic layer 25 may be made of an alloy represented by X'—Pt—Mn, wherein X represents at least one element selected from Pd, Ru, Ir, Rh, Os, Au, and Ag.

In the PtMn alloy and the alloy represented by the formula X—Mn, the content of Pt or X is preferably in the range of 37 to 63 atomic and more preferably in the range of 47 to 57 atomic %.

In the alloy represented by the formula X'—Pt—Mn, the total content of X'+Pt is preferably in the range of 37 to 63 atomic and more preferably in the range of 47 to 57 atomic %. In the alloy represented by the formula X'—Pt—Mn, the X' content is preferably in the range of 0.2 to 10 atomic %.

The antiferromagnetic layer 25 producing a high exchange coupling magnetic field can be obtained by annealing an alloy having the above-described appropriate composition. Particularly, by using the PtMn alloy, the antiferromagnetic layer 25 can have a exchange coupling magnetic field as high as 800 (Qe) and a block temperature of as high as 380° C. The block temperature is the temperature at which the exchange coupling magnetic field is lost.

The pinned magnetic layer 24 comprises a ferromagnetic thin film, which is preferably made of Co, a NiFe alloy, a CoNiFe alloy, a CoFe alloy, a CoNi alloy, or the like.

The nonmagnetic conductive layer 23 is preferably made of a nonmagnetic material such as Cu, Cr, Au, Ag, or the like.

The free magnetic layer 22 is preferably made of the same material as the pinned magnetic layer 24. Although, in FIG. 1, the free magnetic layer 22 comprises a single layer, the free magnetic layer 22 may have a multilayer structure such as a lamination of Co film and NiFe alloy film.

In a giant magnetoresistive effect generating mechanism having a structure in which the nonmagnetic conductive layer 23 is held between the pinned magnetic layer 24 and the free magnetic layer 22, the pinned magnetic layer 24 and the free magnetic layer 22 are made of the same material and have a low possibility of causing a factor other than spin-dependent scanning of conduction electrons, and thus permit the achievement of the high magnetoresistive effect, as compared with those layers made of different materials.

The conductive layers 26 are preferably made of Cr, Ta, Au, Cu, or the like.

In the thin film magnetic head 3, the magnetization direction of the free magnetic layer 22 is changed by a leakage magnetic field from the recording medium such as a hard disk. The magnetization of the pinned magnetic layer 24 is pinned in the Y direction. Accordingly, the changed magnetization direction of the free magnetic layer 22 changes the electric resistance of the spin-valve thin film magnetic element 10. Therefore, the voltage is changed based on the change in electric resistance value to detect the leakage magnetic field from the recording medium.

Next, the method of manufacturing the thin film magnetic head 3 is described with reference to FIGS. 5 to 10.

Figure 5:
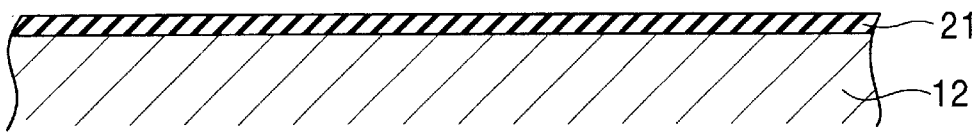
FIG. 5 shows the lamination of an insulating layer onto a lower shield layer according to a method of manufacturing the thin film magnetic head shown in FIG. 1.

As shown in FIG. 5, the insulating layer 21 is first laminated on the lower shield layer 12.

Figure 6:
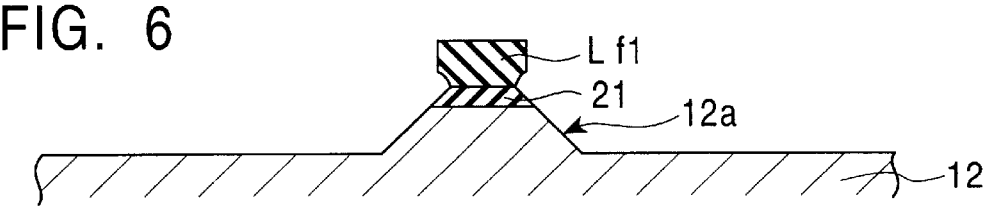
FIG. 6 shows the formation and etching of a lift-off resist according to the method of manufacturing the thin film magnetic head shown in FIG. 1.

Next, as shown in FIG. 6, a lift-off resist Lf1 is formed on the insulating layer 21 by PEB (Post Expose Bake) method, or the like. Both sides of the lift-off resist Lf1 are etched by an ion milling method (physical ion beam etching) to form the projection 12a.

Figure 7:
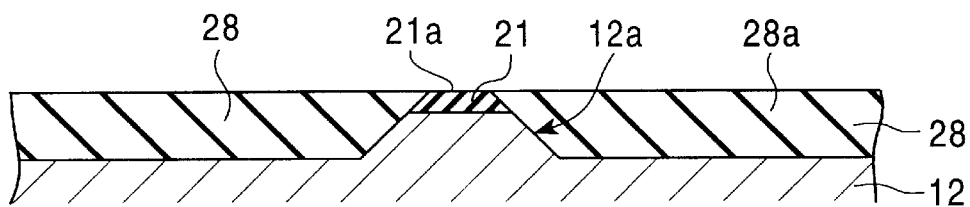
FIG. 7 shows the lamination of bias layers and removal of a resist according to a method of manufacturing the thin film magnetic head shown in FIG. 1.

Next, as shown in FIG. 7, the insulating bias layers 28 are laminated on the lift off resist Lf1 and both sides thereof (both sides of the projection 12a). The lift off resist Lf1 is removed. In this way, the pair of insulating bias layers 28 are formed. The insulating bias layers 28 are laminated until the upper surfaces (layer surfaces) 28a thereof and the upper surface (layer surface) 21a of the insulating layer 21 form the same plane.

Figure 8:
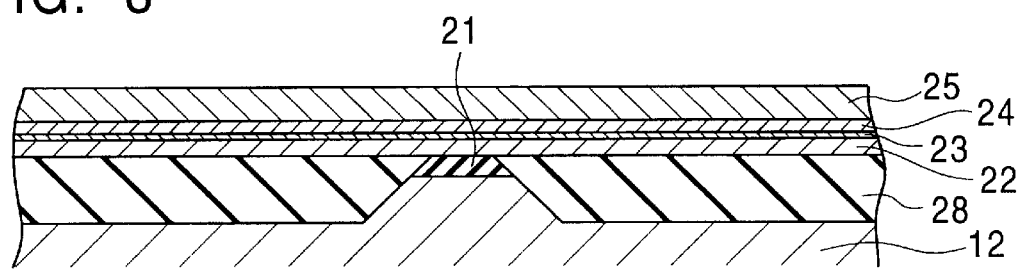
FIG. 8 shows a lamination of various layers according to a method of manufacturing the thin film magnetic head shown in FIG. 1.

Next, as shown in FIG. 8, the free magnetic layer 22, the nonmagnetic conductive layer 23, the pinned magnetic layer 24 and the antiferromagnetic layer 25 are laminated in turn on the insulating bias layers 28 and the insulating layer 21.

Figure 9:
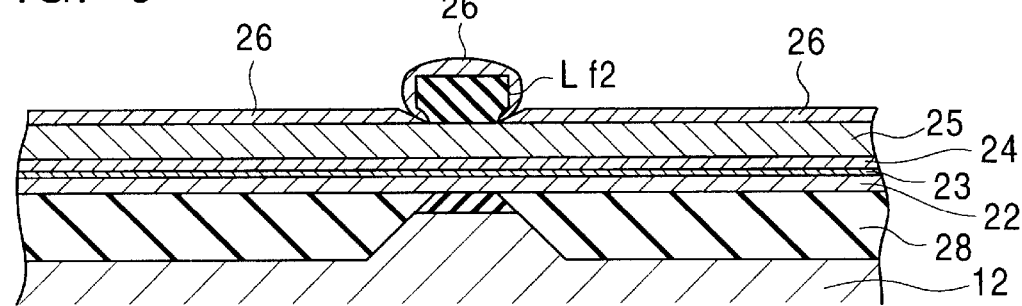
FIG. 9 shows the formation of a lift-off resist and the lamination of a conductive layer according to a method of manufacturing the thin film magnetic head shown in FIG. 1.

Next, as shown in FIG. 9, a lift-off resist Lf2 is formed on the antiferromagnetic layer 25, and the conductive layer 26 is laminated on the lift off resist Lf2 and both sides thereof.

The upper surfaces 28a of the insulating bias layers 28 must be etched by reverse sputtering means or the like before the free magnetic layer 22 is laminated.

This is because the lift-off resist Lf1 is formed outside a sputtering apparatus, and thus the upper surfaces 28a are temporarily exposed to the atmospheric pressure and are contaminated with impurities such as oxygen and the like in air. When the free magnetic layer 22 is laminated on the contaminated upper surfaces 28a, no exchange coupling magnetic field can be exhibited in the interfaces. Therefore, the upper surfaces 28a of the insulating bias layers 28 must be etched to remove the impurities before the free magnetic layer 22 is laminated.

Figure 10:
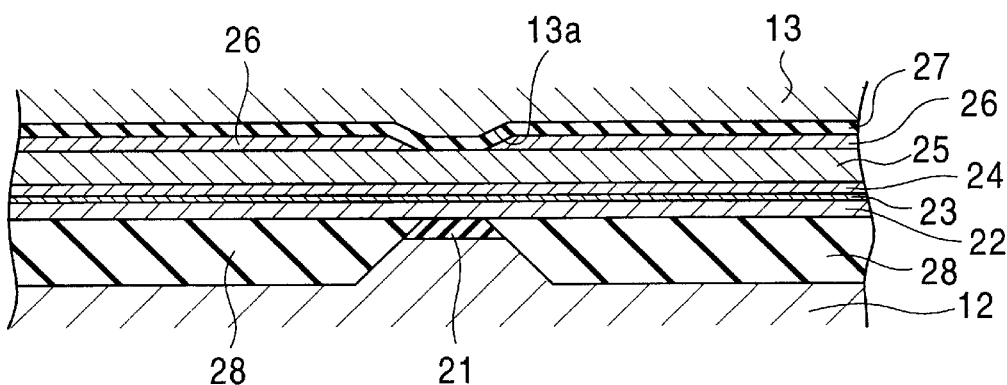
FIG. 10 shows the removal of a lift-off resist and the lamination of additional layers according to a method of manufacturing the thin film magnetic head shown in FIG. 1.

Finally, as shown in FIG. 10, the lift-off resist Lf2 is removed. The insulating layer 27 and the upper shield layer 13 are laminated.

The conductive layer 26, laminated on the lift-off resist Lf2, is removed together with the lift-off resist Lf2 to form a portion where the conductive layer 26 is not laminated on the antiferromagnetic layer 25, thereby producing a step in the insulating layer 27 laminated on this portion. This portion forms the projection 13a in the upper shield layer 13.

Therefore, the conductive layers 26 are arranged on both sides of the projection 13a of the upper shield layer 13.

The height of the step of the insulating layer 27 corresponds to the thickness of the conductive layers 26.

In this way, the thin film magnetic head 3 is manufactured.

In the thin film magnetic head 3, the pair of the insulating bias layers 28 are buried in the lower shield layer 12. The insulating layer 21, the free magnetic layer 22, the nonmagnetic conductive layer 23, the pinned magnetic layer 24, and the antiferromagnetic layer 25 are laminated on the insulating bias layers 28, the lower shield layer 12, and the insulating layer 21. Furthermore, the pair of the conductive layers 26 are laminated, and thus the step of the insulating layer 27, which constitutes the upper surface of the spin-valve thin film magnetic element 10, corresponds to the thickness of the conductive layers 26. Therefore, this step is less than the step produced near the track portion G2 of a conventional thin film magnetic head.

Namely, as shown in FIG. 4, the pair of the insulating bias layers 28 are arranged on both sides of the projection 12a of the lower shield layer 12 in the X1 direction to decrease the step of the insulating layer 27. Therefore, no step occurs in the upper shield layer 13. Even when the gap layer 14 and the upper core layer 17 are laminated on the upper shield layer 13 to form the inductive head 4, no step occurs in the gap layer 14, thereby preventing warping of the shape of the write magnetic gap G1 of the inductive head 4.

The insulating bias layers 28 are arranged between the lower shield layer 12 and the free magnetic layer 22. Even when the lower shield layer 12 is partly extended to cause a sag in polishing the medium-facing surface to determine the gap depth, there is the low probability that the sag reaches the free magnetic layer 22 across the insulating bias layers 28, thereby decreasing the probability of the occurrence of a short circuit between the lower shield layer 12 and the spin-valve thin film magnetic element 10.

The pair of the insulating bias layers 28 are buried in the lower shield layer 12 and the insulating layer 21. Even when the spin-valve thin film magnetic element 10 and the insulating layers 21 and 27 are thinned to narrow the gap with an increase in the magnetic recording density, the insulating bias layers 28 need not be thinned. Therefore, the magnetization direction of the free magnetic layer 22 can securely be oriented in one direction.

In the thin film magnetic head 3, the layer surface 21a of the insulating layer 21 formed on the projection 12a and the layer surfaces 28a of the pair of insulating bias layers 28 lie in the same plane. The free magnetic layer 22 is laminated on the same plane, thereby producing no step in the free magnetic layer 22. Therefore, the magnetization direction of the free magnetic layer 22 can securely be oriented in the direction of the track width, decreasing Barkhausen noise.

Furthermore, in the thin film magnetic head 3, the pair of the conductive layers 26 are arranged on both sides of the projection 13a of the upper shield layer 13. The conductive layers 26 are partly buried in the upper shield layer 13. Therefore, even when the spin-valve thin film magnetic element 10 is thinned to narrow the track with an increase in the magnetic recording density, the conductive layers 26 need not be thinned, and thus the sensing current can efficiently be supplied to the free magnetic layer 22.

Second Embodiment

Figure 11:
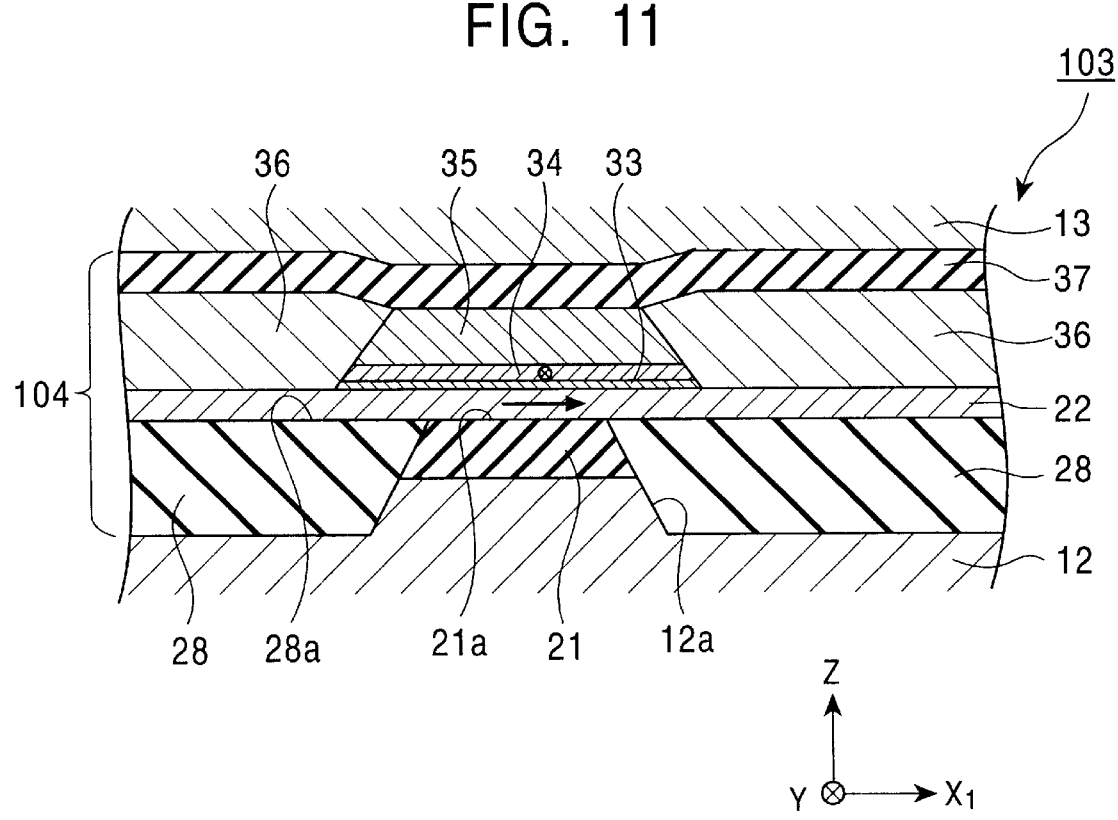
FIG. 11 is a sectional view of a thin film magnetic head in accordance with a second embodiment of the present invention, as viewed from the medium-facing surface side.

FIG. 11 is a sectional view of a thin film magnetic head 103 in accordance with a second embodiment of the present invention. In FIG. 11, the same components as those shown in FIGS. 1 to 4 are denoted by the same reference numerals, and the description of these components is brief or omitted.

As shown in FIG. 11, like the above-mentioned thin film magnetic head 3, the thin film magnetic head 103 constitutes a floating magnetic head together with the inductive head 4 (see FIG. 4). The thin film magnetic head 103 comprises a spin-valve thin film magnetic element 104, and an upper shield layer 13 and a lower shield layer 12 laminated on both sides of the spin-valve thin film magnetic element 104 in the direction of the thickness thereof.

As shown in FIG. 11, a projection 12a is provided in the lower shield layer 12 to project toward the spin-valve thin film magnetic element 104 side.

In FIG. 11, the Z direction is the movement direction of the magnetic recording medium. The Y direction is the direction of a leakage magnetic field from the magnetic recording medium. The X1 direction of the direction of the track width of the thin film magnetic head 103.

In the spin-valve thin film magnetic element 104, an insulating layer 21 is provided on the projection 12a of the lower shield layer 12. A pair of insulating bias layers 28 are arranged on both sides of the projection 12a and the insulating layer 21 in the X1 direction shown in FIG. 11 (on both sides in the direction of the track width).

The insulating bias layers 28 are laminated to a thickness with which the upper surfaces 28a (layer surfaces) of the insulating bias layers 28 and the upper surface (layer surface) 21a of the insulating layer 21 form the same plane.

The pair of the insulating bias layers 28 are arranged on both sides of the projection 12a of the lower shield layer 12 in the X1 direction so that the insulating layers 28 are partly buried in the lower shield layer 12.

Furthermore, a free magnetic layer 22 is laminated on the insulating bias layers 28 and the insulating layer 21. The free magnetic layer 22 is insulated from the lower shield layer 12 by the insulating layer 21 and the insulating bias layers 28.

A nonmagnetic conductive layer 33, a pinned magnetic layer 34, and an antiferromagnetic layer 35 are laminated in turn on the free magnetic layer 22. Each of the nonmagnetic conductive layer 33, the pinned magnetic layer 34 and the antiferromagnetic layer 35 has a substantially trapezoidal sectional shape having a width corresponding to the track width.

Furthermore, a pair of conductive layers 36 are laminated on the free magnetic layer 22 so as to be located on both sides (both sides in the track width direction) of the nonmagnetic conductive layer 33, the pinned magnetic layer 34, and the antiferromagnetic layer 35 in the X1 direction.

Furthermore, an insulating layer 37 made of $Al_2O_3$ or the like is laminated on the conductive layers 36 and the antiferromagnetic layer 35. The upper shield layer 13 is laminated on the insulating layer 37.

The insulating bias layers 28 are brought into contact with the free magnetic layer 22 so that an exchange coupling magnetic field (exchange anisotropic magnetic field) is exhibited in the interfaces between the insulating bias layers 28 and the free magnetic layer 22. Therefore, the magnetization direction as of the free magnetic layer 22 is oriented in the X1 direction shown in the drawing by the exchange coupling magnetic field.

The antiferromagnetic layer 35 is made of a material equivalent to the above-described antiferromagnetic layer 25. The antiferromagnetic layer is laminated on the pinned magnetic layer 34 to exhibit the exchange coupling magnetic field (exchange anisotropic magnetic field) in the interface between the pinned magnetic layer 34 and the antiferromagnetic layer 35 so that the magnetization direction of the pinned magnetic layer 34 is pinned in the Y direction as shown in the drawing.

As a result, the magnetization direction of the free magnetic layer 22 crosses the magnetization direction of the pinned magnetic layer 34.

The pinned magnetic layer 34, the nonmagnetic conductive layer 33, and the conductive layers 36 are made of materials equivalent to those of the above-described pinned magnetic layer 24, nonmagnetic conductive layer 23, and conductive layers 26, respectively.

In the thin film magnetic head 103, the magnetization direction of the free magnetic layer 22 is changed by a leakage magnetic field from the recording medium such as a hard disk. The magnetization of the pinned magnetic layer 34 is pinned in the Y direction. Accordingly, the changed magnetization d direction of the free magnetic layer 22 changes the electric resistance of the spin-valve thin film magnetic element 104. Therefore, the voltage is changed based on the change in electric resistance value to detect the leakage magnetic field from the recording medium.

The method of manufacturing the thin film magnetic head 103 is partially the same as the above-mentioned thin film magnetic head 3. Namely, the steps shown in FIGS. 5 to 8 are common to the steps for manufacturing the thin film magnetic head 103.

In the thin film magnetic head 103, the nonmagnetic conductive layer 33, the pinned magnetic layer 34, and the antiferromagnetic layer 35 are laminated in turn on the free magnetic layer 22 (FIG. 8). Then a lift-off resist is formed on the antiferromagnetic layer 35.

Both sides of the lift-off resist are etched by the ion milling method (physical ion beam etching) until the free magnetic layer 22 is exposed. The nonmagnetic conductive layer 33, the pinned magnetic layer 34 and the antiferromagnetic layer r 35 are thus formed in a substantially trapezoidal sectional shape.

Then, the conductive layers 36 are laminated on both sides of the nonmagnetic conductive layer 33, the pinned magnetic layer 34 and the antiferromagnetic layer 35. The lift off resist is then removed. The insulating layer 37 and the upper shield layer 13 are further laminated to obtain the thin film magnetic head 103.

In the thin film magnetic head 103, the pair of the insulating bias layers 28 are arranged on both sides of the projection 12a of the lower shield layer 12 in the X1 direction to decrease the step of the insulating layer 37, thereby causing no step in the upper shield layer 13. For example, even when the gap layer 14 and the upper core layer 17 are laminated on the upper shield layer 13 to form the inductive head 4, no step occurs in the gap layer 14, thereby preventing warping of the shape of the write magnetic gap G1 of the inductive head 4.

The insulating bias layers 28 are arranged between the lower shield layer 12 and the free magnetic layer 22. Even when the lower shield layer 12 is partly extended to cause a sag during polishing of the medium-facing surface to determine the gap depth, there is the low probability that the sag reaches the free magnetic layer 22 across the insulating bias layers 28, thereby decreasing the probability of the occurrence of a short circuit between the lower shield layer 12 and the spin-valve thin film magnetic element 104.

Since the pair of the insulating bias layers 28 are buried in the lower shield layer 12 and the insulating layer 21, even when the spin-valve thin film magnetic element 104 and the insulating layers 21 and 37 are thinned to narrow the gap with an increase in the magnetic recording density, the insulating bias layers 28 need not be thinned. Therefore, the magnetization direction of the free magnetic layer 22 can securely be oriented in one direction.

In the thin film magnetic head 103, the conductive layers 36 are brought into contact with the free magnetic layer 22. Thus, the sensing current can efficiently be supplied to the free magnetic layer 22, thereby increasing the sensitivity of the thin film magnetic head 103.

Furthermore, the pair of the insulating bias layers 28 are buried in the lower shield layer 12 and the insulating layer 21. The conductive layers 36 are located on both sides of the nonmagnetic conductive layer 33, the pinned magnetic layer 34, and the antiferromagnetic layer 35 in the direction of the track width. Therefore, the spin-valve thin film magnetic element 104 can be further thinned to narrow the track of the thin film magnetic head 103.

Third Embodiment

Figure 12:
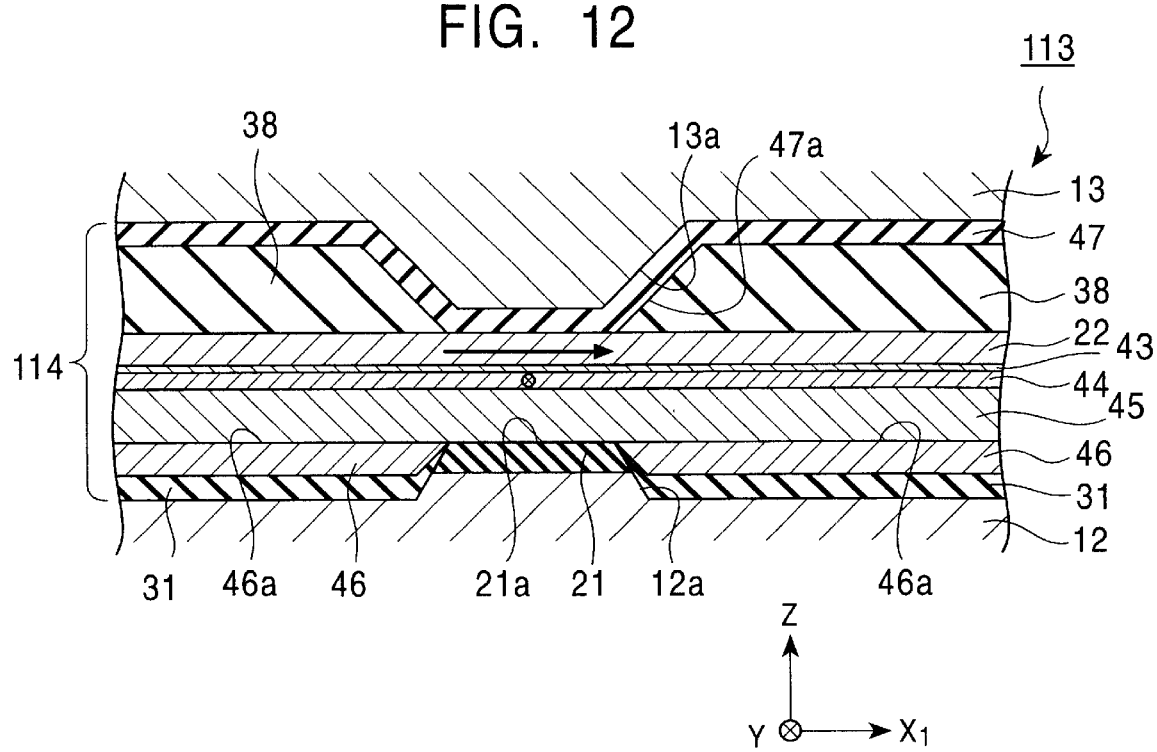
FIG. 12 is a sectional view of a thin film magnetic head in accordance with a third embodiment of the present invention, as viewed from the medium-facing surface side.

FIG. 12 is a sectional view of a thin film magnetic head 113 in accordance with a third embodiment of the present invention. In FIG. 12, the same components as those shown in FIGS. 1 to 4 are denoted by the same reference numerals. The description of these components is brief or omitted.

As shown in FIG. 12, like the above-mentioned thin film magnetic head 3, the thin film magnetic head 113 constitutes a floating magnetic head together with the inductive head 4 (see FIG. 4). The thin film magnetic head comprises a spin-valve thin film magnetic element 114, and an upper shield layer 13 and a lower shield layer 12 laminated on both sides of the spin-valve thin film magnetic element 114 in the direction of the thickness thereof.

As shown in FIG. 12, a projection 12a is provided in the lower shield layer 12 to project toward the spin-valve thin film magnetic element 114 side. A projection 13a is provided in the upper shield layer 13 to project toward the spin-valve thin film magnetic element 114 side.

In FIG. 12, the Z direction is the movement direction of the magnetic recording medium. The Y direction is the direction of a leakage magnetic field from the magnetic recording medium. The X1 direction of the direction of the track width of the thin film magnetic head 113.

The spin-valve thin film magnetic element 114 is a bottom-type single spin-valve thin film magnetic element in which an antiferromagnetic layer 45, a pinned magnetic layer 44, a nonmagnetic conductive layer 43, and a free magnetic layer 22 are laminated in turn.

In the spin-valve thin film magnetic element 114, an insulating layer 21 is provided on the projection 12a of the lower shield layer 12. A pair of interlayer insulating layers 31 and a pair of conductive layers 46 are laminated in turn on both sides of the projection 12a in the X1 direction shown in FIG. 12.

The interlayer insulating layers 31 are extended on the inclined surfaces of the projection 12a to contact the insulating layer 21.

The conductive layers 46 are laminated to a thickness with which the upper surfaces 46a (layer surfaces) of the conductive layers 46 and the upper surface (layer surface) 21a of the insulating layer 21 form the same plane.

The pair of conductive layers 46 are arranged on both sides of the projection 12a of the lower shield layer 12 in the X1 direction. The conductive layers 46 are partly buried in the lower shield layer 12.

Furthermore, an antiferromagnetic layer 45 is laminated on the conductive layers 46 and the insulating layer 21. The conductive layers 46 and the antiferromagnetic layer 45 are insulated from the lower shield layer 12 by the insulating layer 21 and the interlayer insulating layers 31.

The pinned magnetic layer 44, the nonmagnetic conductive layer 43, and the free magnetic layer 22 are laminated in turn on the antiferromagnetic layer 45.

Furthermore, a pair of insulating bias layers 38 are laminated on the free magnetic layer 22 so as to be spaced along the X1 direction (the track width direction). Furthermore, an insulating layer 47 made of $Al_2O_3$ or the like is laminated on the insulating bias layers 38. The free magnetic layer 22. The upper shield layer 13 is laminated on the insulating layer 47.

The free magnetic layer 22 is insulated from the upper shield layer 13 by the insulating bias layers 38 and the insulating layer 47.

As shown in FIG. 12, a projection 47a of the insulating layer 47, and the projection 13a of the upper shield layer 13 are located between the pair of the insulating bias layers 38. Namely, the insulating bias layers 38 are located on both sides of the projection 13a of the upper shield layer 13 in the direction of the track width so that the insulating bias layers 38 are buried in the upper shield layer 13.

The insulating bias layers 38 are made of a material equivalent to the above-described insulating bias layers 28, and are brought into contact with the free magnetic layer 22 so that an exchange coupling magnetic field (exchange anisotropic magnetic field) is exhibited in each of the interfaces between the insulating bias layers 38 and the free magnetic layer 22. Therefore, the magnetization direction of the free magnetic layer 22 is oriented in the X1 direction shown in the drawing by the exchange coupling magnetic field.

The antiferromagnetic layer 45 is made of a material equivalent to the above-described antiferromagnetic layer 25, and is brought into contact with the pinned magnetic layer 44 to exhibit the exchange coupling magnetic field (exchange anisotropic magnetic field) in the interface between the pinned magnetic layer 44 and the antiferromagnetic layer 45 so that the magnetization direction of the pinned magnetic layer 44 is pinned in the Y direction shown in the drawing.

As a result, the magnetization direction of the free magnetic layer 22 crosses the magnetization direction of the pinned magnetic layer 44.

The pinned magnetic layer 44, the nonmagnetic conductive layer 43, and the conductive layers 46 are made of materials equivalent to those of the above-described pinned magnetic layer 24, nonmagnetic conductive layer 23, and conductive layers 26, respectively.

The thin film magnetic head 113 is manufactured by a method similar to the method of manufacturing the thin film magnetic head 3 of the first embodiment.

The method of manufacturing the thin film magnetic head 113 of this embodiment is mainly different from the method of manufacturing the thin film magnetic head 3 of the first embodiment in that the pair of the conductive layers 46 are formed on both sides of the projection 12a of the lower shield layer 12. In addition, the antiferromagnetic layer 45, the pinned magnetic layer 44, the nonmagnetic conductive layer 43, and the free magnetic layer 22 are laminated in turn on the projection 12a of the lower shield layer 12. Furthermore, the pair of the insulating bias layers 38 are formed on the free magnetic layer 22.

Namely, the insulating layer 21 is laminated on the lower shield layer 12. Then a lift-off resist is formed on the insulating layer 21. Both sides of the lift-off resist in the direction of the track width are etched to form the projection 12a.

Then, the interlayer insulating layers 31 and the conductive layers 46 are laminated on the exposed portions of the lower shield layer and the lift-off resist. The lift-off resist is removed.

Next, the antiferromagnetic layer 45, the pinned magnetic layer 44, the nonmagnetic conductive layer 43, and the free magnetic layer 22 are laminated in turn on the conductive layers 46.

Then, a lift-off resist is formed on the free magnetic layer 22. The insulating bias layers 38 are formed on the lift-off resist and both sides thereof in the direction of the track width. Then, the lift-off resist is removed. The insulating layer 47 and the upper shield layer 13 are further laminated to obtain the thin film magnetic head 113.

The upper surface of the free magnetic layer 22 must be etched by reverse sputtering means or the like before the insulating bias layers 38 are laminated on the free magnetic layer 22.

This is because the lift-off resist is formed outside a sputtering apparatus. The free magnetic layer 22 is temporarily exposed to the atmospheric pressure and is contaminated with impurities such as oxygen and the like in air. When the insulating bias layers 38 are laminated on the contaminated upper surface, no exchange coupling magnetic field can be exhibited in the interfaces. Therefore, the upper surface of the free magnetic layer 22 must be etched to remove the impurities before the insulating bias layers 38 are laminated on the free magnetic layer 22.

In the thin film magnetic head 113, the pair of the conductive layers 46 are buried in the lower shield layer 12 and the insulating layer 21. The height of the step formed in the insulating layer 47, which constitutes the upper surface of the spin-valve thin film magnetic element 114, corresponds to the thickness of the insulating bias layers 38. Therefore, the step is less than that produced near the track portion G2 of the conventional thin film magnetic head.

Namely, the pair of conductive layers 46 are arranged on both sides of the projection 12a of the lower shield layer 12 in the X1 direction to decrease the step of the insulating layer 47, thereby causing no step in the upper shield layer 13.

For example, even when the gap layer 14 and the upper core layer 17 are laminated on the upper shield layer 13 to form the inductive head 4, no step occurs in the gap layer 14, thereby preventing warping of the shape of the write magnetic gap G1 of the inductive head 4.

The insulating bias layers 38 are arranged between the upper shield layer 13 and the free magnetic layer 22. Even when the upper shield layer 13 is partly extended to cause a sag during polishing of the medium-facing surface to determine the gap depth, there is low probability that the sag reaches the free magnetic layer 22 across the insulating bias layers 38. Hence, the probability of a short circuit between the upper shield layer 13 and the spin-valve thin film magnetic element 114 is lower.

The pair of conductive layers 46 are buried in the lower shield layer 12. The insulating bias layers 38 are buried in the upper shield layer 13. Even when the spin-valve thin film magnetic element 114 and the insulating layers 21 and 47 are thinned to narrow the gap due to an increase in the magnetic recording density, the insulating bias layers 38 and the conductive layers 46 need not be thinned. Therefore, the magnetization direction of the free magnetic layer 22 can be securely oriented in one direction. The sensing current can efficiently be supplied to the free magnetic layer 22, thereby increasing the sensitivity of the thin film magnetic head 113.

Fourth Embodiment

Figure 13:
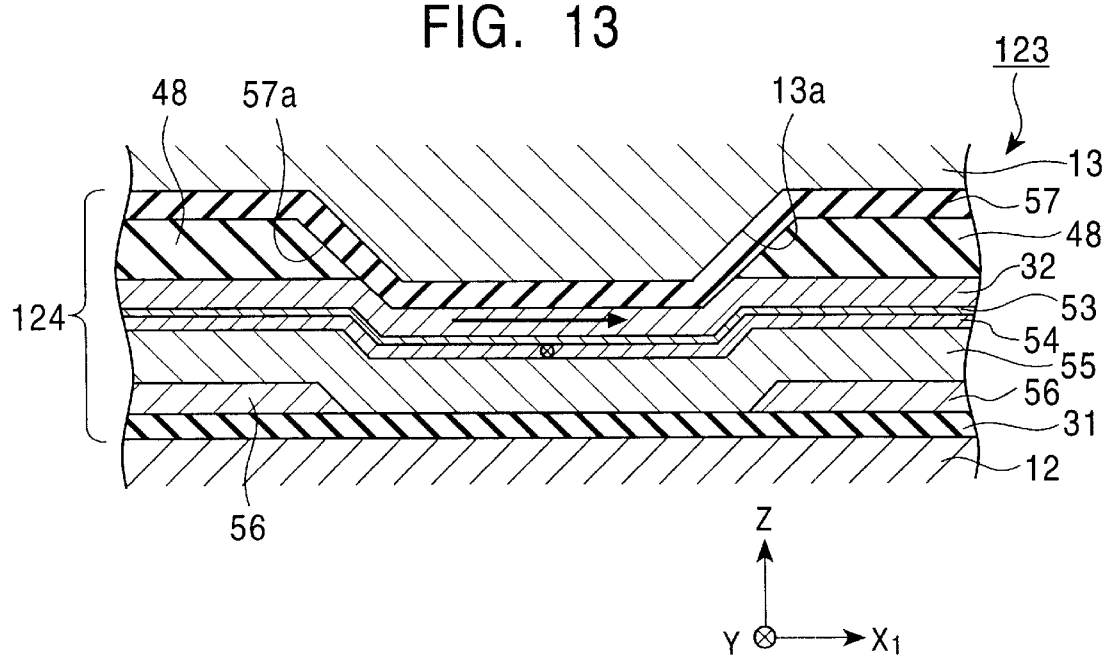
FIG. 13 is a sectional view of a thin film magnetic head in accordance with a fourth embodiment of the present invention, as viewed from the medium-facing surface side.

FIG. 13 is a sectional view of a thin film magnetic head 123 in accordance with a fourth embodiment of the present invention. In FIG. 13, the same components as those shown in FIGS. 1 to 4 are denoted by the same reference numerals. The description of these components is brief or omitted.

As shown in FIG. 13, like the above-mentioned thin film magnetic head 3, the thin film magnetic head 123 constitutes a floating magnetic head together with the inductive head 4 (see FIG. 4). The thin film magnetic head 123 comprises a spin-valve thin film magnetic element 124, and an upper shield layer 13 and a lower shield layer 12 laminated on both sides of the spin-valve thin film magnetic element 124 in the direction of the thickness thereof.

As shown in FIG. 13, a projection 13a is provided in the upper shield layer 13 to project toward the spin-valve thin film magnetic element 124 side.

In FIG. 13, the Z direction is the movement direction of the magnetic recording medium. The Y direction is the direction of a leakage magnetic field from the magnetic recording medium. The X1 direction of the direction of the track width of the thin film magnetic head 123.

The spin-valve thin film magnetic element 124 is a bottom-type single spin-valve thin film magnetic element in which an antiferromagnetic layer, a pinned magnetic layer, a nonmagnetic conductive layer, and a free magnetic layer are laminated in turn.

In the spin-valve thin film magnetic element 124, an insulating layer 31 made of $Al_2O_3$ or the like is provided on the lower shield layer 12. A pair of conductive layers 56 are laminated on the insulating layer 31 to be spaced in the X1 direction shown in FIG. 13.

Also, an antiferromagnetic layer 55 is laminated on the conductive layers 56 and the insulating layer 31 to cover these layers. A pinned magnetic layer 54, a nonmagnetic conductive layer 53, and a free magnetic layer 32 are laminated in turn on the antiferromagnetic layer 55.

Furthermore, a pair of insulating bias layers 48 are laminated on the free magnetic layer 32 so as to be spaced along the X1 direction. An insulating layer 57 made of $Al_2O_3$ or the like is laminated on the insulating bias layers 48 and the free magnetic layer 32 to cover these layers. The upper shield layer 13 is laminated on the insulating layer 57.

The free magnetic layer 32 is insulated from the upper shield layer 13 by the insulating layer 57 and the insulating bias layers 48.

As shown in FIG. 13, the projection 13a of the upper shield layer 13 is located between the pair of the insulating bias layers 48. Namely, the insulating bias layers 48 are located on both sides of the projection 13a of the upper shield layer 13 in the direction of the track width so that the insulating bias layers 48 are buried in the upper shield layer 13.

The insulating bias layers 48 are made of a material equivalent to the above-described insulating bias layers 28, and brought into contact with the free magnetic layer 32 so that an exchange coupling magnetic field (exchange anisotropic magnetic field) is exhibited in each of the interfaces between the insulating bias layers 48 and the free magnetic layer 32. Therefore, the magnetization direction of the free magnetic layer 32 is oriented in the X1 direction shown in the drawing by the exchange coupling magnetic field.

The antiferromagnetic layer 55 is made of a material equivalent to the above-described antiferromagnetic layer 25, and brought into contact with the pinned magnetic layer 54 to exhibit the exchange coupling magnetic field (exchange anisotropic magnetic field) in the interface between the pinned magnetic layer 54 and the antiferromagnetic layer 55 so that the magnetization direction of the pinned magnetic layer 54 is pinned in the Y direction shown in the drawing.

As a result, the magnetization direction of the free magnetic layer 32 crosses the magnetization direction of the pinned magnetic layer 54.

The free magnetic layer 32, the pinned magnetic layer 54, the nonmagnetic conductive layer 53, and the conductive layers 56 are made of materials equivalent to those of the above-described free magnetic layer 22, pinned magnetic layer 24, nonmagnetic conductive layer 23, and conductive layers 26, respectively.

The thin film magnetic head 123 is manufactured as follows.

First, the insulating layer 31 is laminated on the lower shield layer 12. A lift-off resist is formed on the insulating layer 31. The conductive layers 56 are formed on the insulating layer 31 and the lift-off resist. The lift-off resist is removed.

Next, the antiferromagnetic layer 55, the pinned magnetic layer 54, the nonmagnetic conductive layer 53, and the free magnetic layer 32 are laminated in turn on the conductive layers 56 and the insulating layer 31.

Then, a lift-off resist is formed on the free magnetic layer 32. The insulating bias layers 48 are formed on the free magnetic layer 32 and the lift-off resist. The lift-off resist is removed.

Finally, the insulating layer 57 is laminated on the insulating bias layers 48 and the free magnetic layer 32. The upper shield layer 13 is further laminated on the insulating layer 57 to obtain the thin film magnetic head 123.

For the same reason as the above, the upper surface of the free magnetic layer 32 is preferably etched by reverse sputtering means or the like before the insulating bias layers 48 are laminated on the free magnetic layer 32.

In the thin film magnetic head 123, the pair of the insulating bias layers 48 are buried in the upper shield layer 13. When the spin-valve thin film magnetic element 124 and the insulating layers 31 and 57 are thinned to narrow the gap with an increase in the magnetic recording density, the insulating bias layers 48 need not be thinned. Therefore, the magnetization direction of the free magnetic layer 32 can be securely oriented in one direction. The sensing current can be efficiently supplied to the free magnetic layer 22, thereby increasing the sensitivity of the thin film magnetic head 123.

In addition, the insulating bias layers 48 are arranged between the upper shield layer 13 and the free magnetic layer 32. When the upper shield layer 13 is partly extended to cause a sag during polishing of the medium-facing surface to determine the gap depth, there is low probability that the sag reaches the free magnetic layer 32 across the insulating bias layers 48, thereby decreasing the probability of a short circuit between the upper shield layer 13 and the spin-valve thin film magnetic element 124.

Fifth Embodiment

Figure 14:
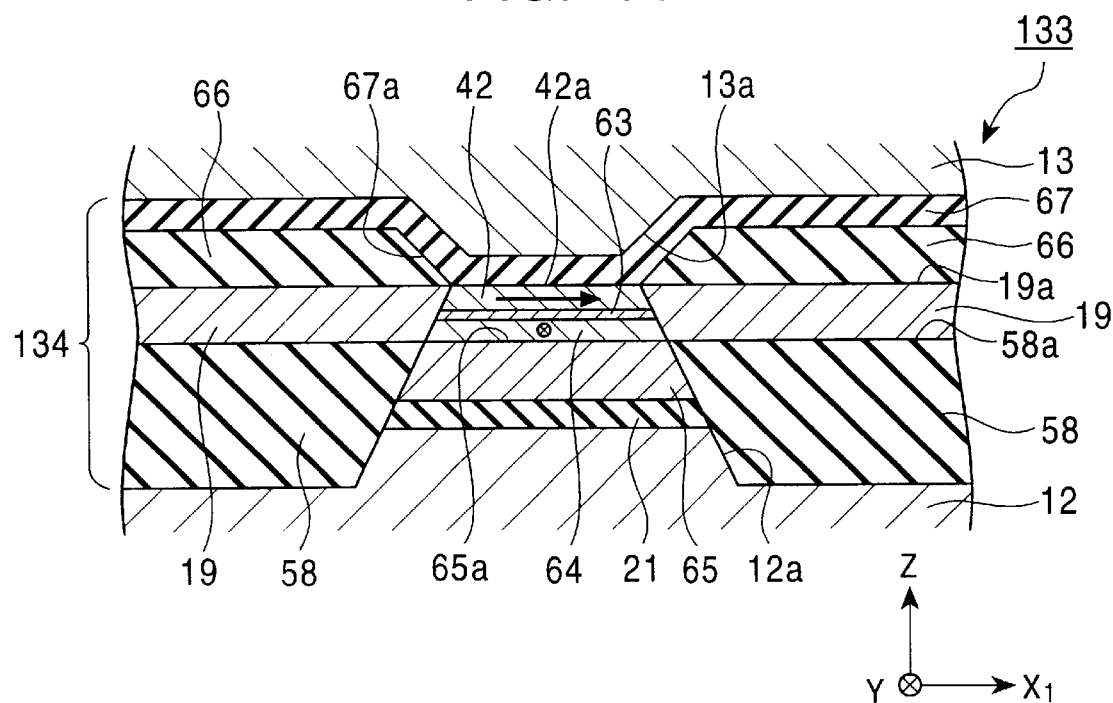
FIG. 14 is a sectional view of a thin film magnetic head in accordance with a fifth embodiment of the present invention, as viewed from the medium-facing surface side.

FIG. 14 is a sectional view of a thin film magnetic head 133 in accordance with a fifth embodiment of the present invention. In FIG. 14, the same components as those shown in FIGS. 1 to 4 are denoted by the same reference numerals. The description of these components is brief or omitted.

As shown in FIG. 14, like the above-mentioned thin film magnetic head 3, the thin film magnetic head 133 constitutes a floating magnetic head together with the inductive head 4 (see FIG. 4). The thin film magnetic head 133 comprises a spin-valve thin film magnetic element 134, and an upper shield layer 13 and a lower shield layer 12 laminated on both sides of the spin-valve thin film magnetic element 134 in the direction of the thickness thereof.

As shown in FIG. 14, a projection 12a is provided in the lower shield layer 12 to project toward the spin-valve thin film magnetic element 134 side. A projection 13a is provided in the upper shield layer 13 to project toward the spin-valve thin film magnetic element 134 side.

In FIG. 14, the Z direction is the movement direction of the magnetic recording medium. The Y direction is the direction of a leakage magnetic field from the magnetic recording medium. The X1 direction of the direction of the track width of the thin film magnetic head 133.

The spin-valve thin film magnetic element 134 is a bottom-type single spin-valve thin film magnetic element in which an antiferromagnetic layer, a pinned magnetic layer, a nonmagnetic conductive layer, and a free magnetic layer are laminated in turn.

In the spin-valve thin film magnetic element 134, an insulating layer 21 is provided on the projection 12a of the lower shield layer 12. Also, an antiferromagnetic layer 65 having a substantially trapezoidal sectional shape is laminated on the insulating layer 21.

Furthermore, a pair of insulating bias layers 58 are arranged on both sides of the projection 12a, the insulating layer 21, and the antiferromagnetic layer 65 in the X1 direction as shown in the drawing (both sides in the direction of the track width). The insulating bias layers 58 are laminated until the upper surfaces 58a (layer surfaces) and the upper surface (layer surface) 65a of the antiferromagnetic layer 65 form the same plane.

The pair of the insulating bias layers 58 are arranged on both sides of the projection 12a of the lower shield layer 12 in the X1 direction shown in the drawing so that the insulating bias layers 58 are partly buried in the lower shield layer 12.

Furthermore, a pinned magnetic layer 64, a nonmagnetic conductive layer 63, and a free magnetic layer 42 are laminated in turn on the insulating bias layers 58 and the antiferromagnetic layer 65. Each of these layers 64, 63 and 42 has a substantially trapezoidal sectional shape having a width corresponding to the track width.

Furthermore, a pair of ferromagnetic layers 19 are arranged on both sides of the pinned magnetic layer 64, the nonmagnetic conductive layer 63 and the free magnetic layer 42 in the X1 direction shown in the drawing (both sides in the direction of the track width). The ferromagnetic layers 19 are laminated on the insulating bias layers 58 so that the upper surfaces 19a and the upper surfaces 42a of the free magnetic layer 42 form the same plane.

Furthermore, a pair of conductive layers 66 are laminated on the ferromagnetic layers 19. An insulating layer 67 is laminated to cover the conductive layers 66 and the free magnetic layer 42. The upper shield layer 13 is laminated on the insulating layer 67.

As shown in FIG. 14, a projection 67a of the insulating layer 67 and the projection 13a of the upper shield layer 13 are located between the pair of the conductive layers 66. Namely, the conductive layers 66 are located on both sides of the projection 13a of the upper shield layer 13 in the direction of the track width so that the conductive layers 66 are buried in the upper shield layer 13.

The insulating bias layers 58 are made of a material equivalent to the above-described insulating bias layers 28, and brought into contact with the ferromagnetic layers 19 so that an exchange coupling magnetic field (exchange anisotropic magnetic field) is exhibited in each of the interfaces between the insulating bias layers 58 and the ferromagnetic layers 19. Therefore, the magnetization direction of each of the ferromagnetic layers 19 is oriented in the X1 direction as shown in the drawing by the exchange coupling magnetic field. Furthermore, a leakage magnetic field of each of the ferromagnetic layers 19 is applied to the free magnetic layer 42 to orient the magnetization direction of the free magnetic layer 42 in the X1 direction shown in the drawing.

The antiferromagnetic layer 65 is made of a material equivalent to the above-described antiferromagnetic layer 25, and brought into contact with the pinned magnetic layer 64 to exhibit the exchange coupling magnetic field (exchange anisotropic magnetic field) in the interface between the pinned magnetic layer 64 and the antiferromagnetic layer 65 so that the magnetization direction of the pinned magnetic layer 64 is pinned in the Y direction shown in the drawing.

As a result, the magnetization direction of the free magnetic layer 42 crosses the magnetization direction of the pinned magnetic layer 64.

The free magnetic layer 42, the pinned magnetic layer 64, the nonmagnetic conductive layer 63, and the conductive layers 66 are made of materials equivalent to those of the above-described free magnetic layer 22, pinned magnetic layer 24, nonmagnetic conductive layer 23, and conductive layers 26, respectively.

The method of manufacturing the thin film magnetic head 133 is described below with reference to FIGS. 15 to 18.

Figure 15:
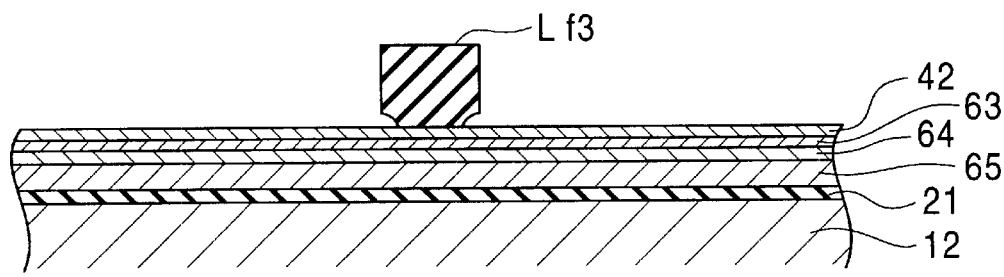
FIG. 15 shows the lamination of various layers onto the lower shield layer according to a method of manufacturing the thin film magnetic head shown in FIG. 14.

As shown in FIG. 15, the insulating layer 21, the antiferromagnetic layer 65, the pinned magnetic layer 64, the nonmagnetic conductive layer 63 and the free magnetic layer 42 are laminated in turn on the lower shield layer 12. Then, a lift-off resist Lf3 is formed on the free magnetic layer 42.

Figure 16:
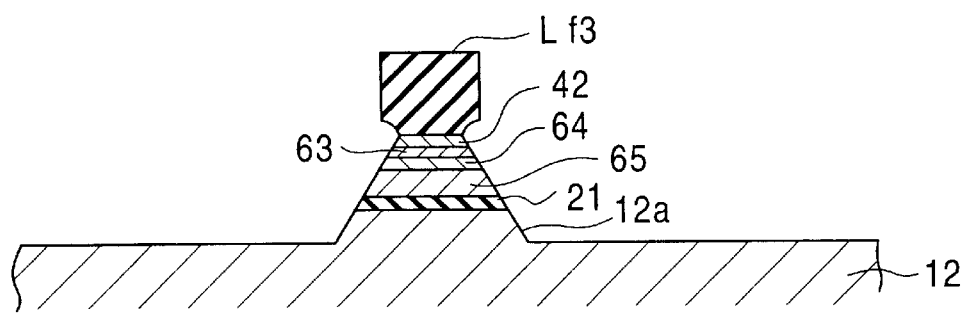
FIG. 16 shows the removal of a lift-off resist according to a method of manufacturing the thin film magnetic head shown in FIG. 14.

Next, as shown in FIG. 16, both sides of the lift-off resist Lf3 are etched by an ion milling method (physical ion beam etching) to the depth of the top of the lower shield layer 12 to form the projection 12a, and to form the free magnetic layer 42, the nonmagnetic conductive layer 63, the pinned magnetic layer 64 and the antiferromagnetic layer 65 in a substantially trapezoidal sectional shape.

Figure 17:
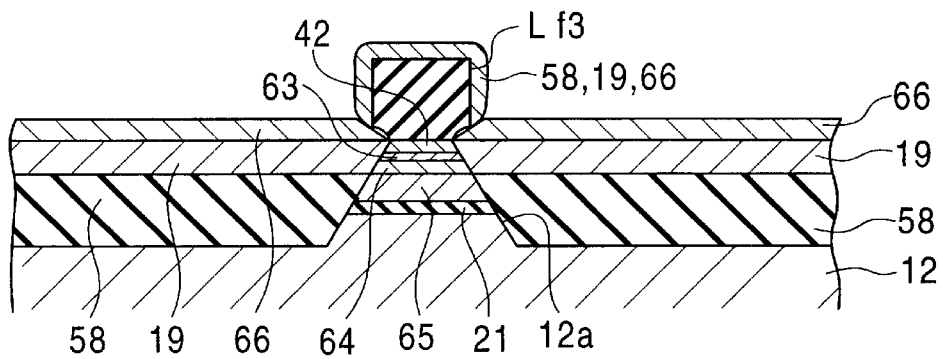
FIG. 17 shows the lamination of various layers according to a method of manufacturing the thin film magnetic head shown in FIG. 14.

Next, as shown in FIG. 17, the insulating bias layers 58, the ferromagnetic layers 19 and the conductive layers 66 are laminated in turn on the lift-off resist Lf3 and both sides thereof (both sides of the projection 12a). The insulating bias layers 58 are laminated to the same position as the upper surface of the antiferromagnetic layer 65. The ferromagnetic layers 19 are laminated to the same position as the upper surface of the free magnetic layer 42.

Figure 18:
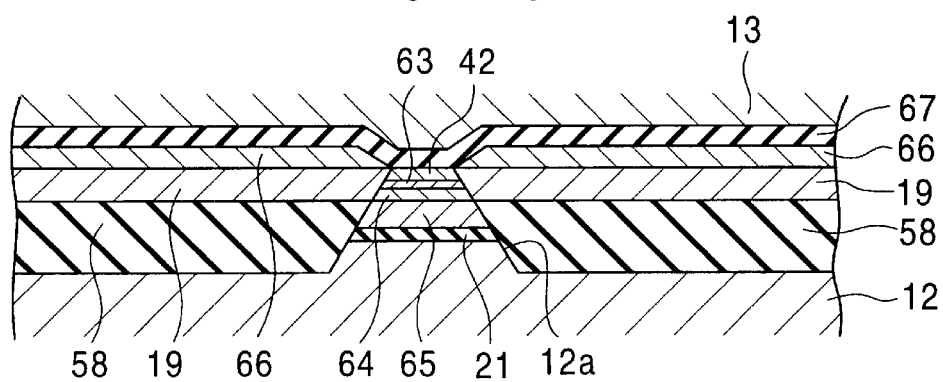
FIG. 18 shows the removal of a lift-off resist according to a method of manufacturing the thin film magnetic head shown in FIG. 14.

Finally, as shown in FIG. 18, the lift-off resist Lf3 is removed. The insulating layer 67 and the upper shield layer 13 are laminated in turn to obtain the thin film magnetic head 133.

In the thin film magnetic head 133, the insulating bias layers 58 are arranged on both sides of the projection 12a of the lower shield layer 12 in the X1 direction to decrease the step of the insulating layer 67, thereby causing no step in the upper shield layer 13. For example, therefore, even when a gap layer 14 and an upper core layer 17 are laminated on the upper shield layer 13 to form the inductive head 4, no step occurs in the gap layer 14, thereby preventing warping of the shape of the write magnetic gap G1 of the inductive head 4.

In the thin film magnetic head 133, the pair of the conductive layers 66 are arranged on both sides of the projection 13a of the upper shield layer 13 so that the conductive layers 66 are partly buried in the upper shield layer 13. When the spin-valve thin film magnetic element 134 is thinned to narrow the gap with an increase in the magnetic recording density, the conductive layers 66 need not be thinned. Therefore, the sensing current can efficiently be supplied to the free magnetic layer 42.

Furthermore, in manufacturing the thin film magnetic head 133, the insulating bias layers 58 and the ferromagnetic layers 19 are laminated in turn to prevent the contamination of the interfaces therebetween with impurities. Therefore, the great exchange coupling magnetic field is exhibited in each of the interfaces between the insulating bias layers 58 and the ferromagnetic layers 19. The magnetization direction of the free magnetic layer 42 can be securely oriented in the direction of the track width by the exchange coupling magnetic field.

Furthermore, the insulating bias layers 58 are arranged between the lower shield layer 12 and the ferromagnetic layers 19. When the lower shield layer 12 is partly extended to cause a sag in polishing the medium-facing surface to determine gap depth, there is the low probability that the sag reaches the ferromagnetic layers 19 across the insulating bias layers 58, thereby decreasing the probability of a short circuit between the lower shield layer 12 and the spin-valve thin film magnetic element 134.

Sixth Embodiment

Figure 19:
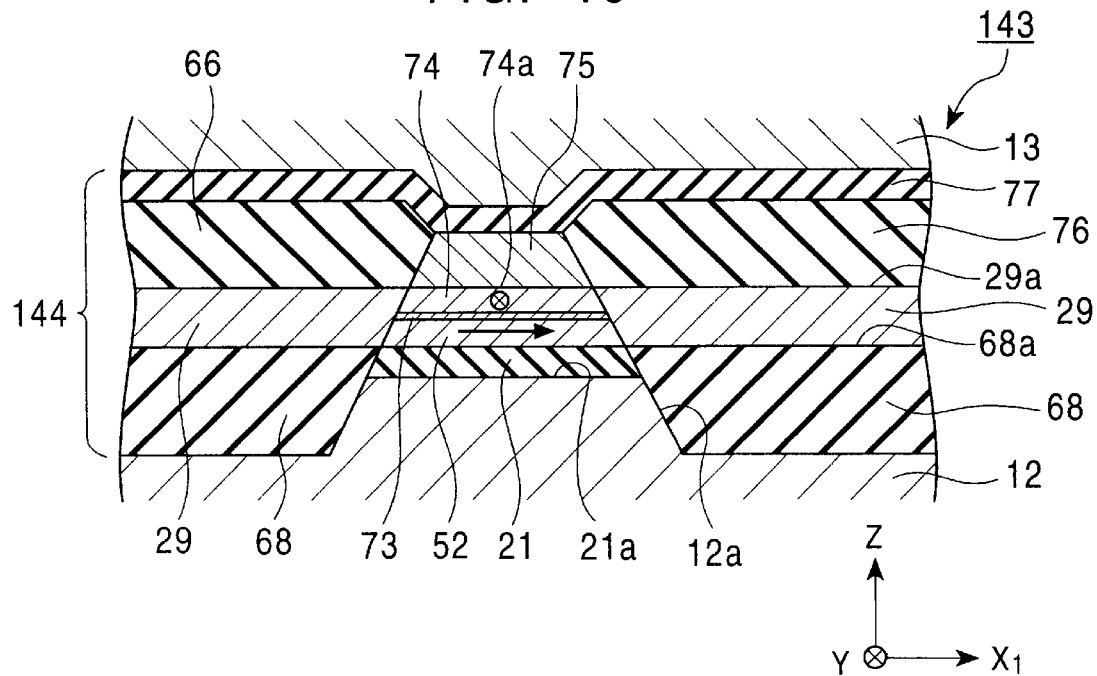
FIG. 19 is a sectional view of a thin film magnetic head in accordance with a sixth embodiment of the present invention, as viewed from the medium-facing surface side.

FIG. 19 is a sectional view of a thin film magnetic head 143 in accordance with a sixth embodiment of the present invention. In FIG. 19, the same components as those shown in FIGS. 1 to 4 are denoted by the same reference numerals. The description of these components is brief or omitted.

As shown in FIG. 19, like the above-mentioned thin film magnetic head 3, the thin film magnetic head 143 constitutes a floating magnetic head together with the inductive head 4 (see FIG. 4). The thin film magnetic head 143 comprises a spin-valve thin film magnetic element 144, and an upper shield layer 13 and a lower shield layer 12 laminated on both sides of the spin-valve thin film magnetic element 144 in the direction of the thickness thereof.

As shown in FIG. 19, a projection 12a is provided in the lower shield layer 12 to project toward the spin-valve thin film magnetic element 144 side.

In FIG. 19, the Z direction is the movement direction of the magnetic recording medium. The Y direction is the direction of a leakage magnetic field from the magnetic recording medium. The X1 direction of the direction of the track width of the thin film magnetic head 143.

The spin-valve thin film magnetic element 144 is a top-type single spin-valve thin film magnetic element in which a free magnetic layer, a nonmagnetic conductive layer, a pinned magnetic layer, and an antiferromagnetic layer are laminated in turn.

In the spin-valve thin film magnetic element 144, an insulating layer 21 is provided on a projection 12a of the lower shield layer 12.

Furthermore, a pair of insulating bias layers 68 are arranged on both sides of the projection 12a and the insulating layer 21 in the X1 direction shown in the drawing (both sides in the direction of the track width). The insulating bias layers 68 are laminated until the upper surfaces 68a (layer surfaces) and the upper surface (layer surface) 21a of the insulating layer 21 form the same plane.

The pair of the insulating bias layers 68 are arranged on both sides of the projection 12a of the lower shield layer 12 in the X1 direction shown in the drawing so that the insulating bias layers 68 are partly buried in the lower shield layer 12.

Furthermore, a free magnetic layer 52, a nonmagnetic conductive layer 73, a pinned magnetic layer 74, and an antiferromagnetic layer 75 are laminated in turn on the insulating layer 21. Each of these layers 52, 73, 74, and 75 has a substantially trapezoidal sectional shape having a width corresponding to the track width.

Furthermore, a pair of ferromagnetic layers 29 are arranged on both sides of the free magnetic layer 52, the nonmagnetic conductive layer 73, and the pinned magnetic layer 74 in the X1 direction shown in the drawing (both sides in the direction of the track width). The ferromagnetic layers 29 are laminated on the insulating bias layers 68 so that the upper surfaces 29a and the upper surfaces 74a of the pinned magnetic layer 74 form the same plane. Namely, the thickness of each of the ferromagnetic layers 29 is the same as the total thickness of the free magnetic layer 52, the nonmagnetic conductive layer 73 and the pinned magnetic layer 74.

Furthermore, a pair of conductive layers 76 are laminated on the ferromagnetic layers 29 to be located on both sides of the antiferromagnetic layer 75 in the X1 direction shown in the drawing (both sides in the direction of the track width).

Furthermore, an insulating layer 77 is laminated on the conductive layers 76 and the antiferromagnetic layer 75. The upper shield layer 13 is laminated on the insulating layer 77.

The insulating bias layers 68 are made of a material equivalent to the above-described insulating bias layers 28, and are brought into contact with the ferromagnetic layers 29 so that an exchange coupling magnetic field (exchange anisotropic magnetic field) is exhibited in each of the interfaces between the insulating bias layers 68 and the ferromagnetic layers 29. Therefore, the magnetization direction of each of the ferromagnetic layers 29 is oriented in the X1 direction shown in the drawing by the exchange coupling magnetic field. Furthermore, a leakage magnetic field of each of the ferromagnetic layers 29 is applied to the free magnetic layer 52 to orient the magnetization direction of the free magnetic layer 52 in the X1 direction shown in the drawing.

The antiferromagnetic layer 75 is made of a material equivalent to the above-described antiferromagnetic layer 25, and is brought into contact with the pinned magnetic layer 74 to exhibit the exchange coupling magnetic field (exchange anisotropic magnetic field) in the interface between the pinned magnetic layer 74 and the antiferromagnetic layer 75 so that the magnetization direction of the pinned magnetic layer 74 is pinned in the Y direction shown in the drawing.

As a result, the magnetization direction of the free magnetic layer 52 crosses the magnetization direction of the pinned magnetic layer 74.

The free magnetic layer 52, the pinned magnetic layer 74, the nonmagnetic conductive layer 73, and the conductive layers 76 are made of materials equivalent to those of the above-described free magnetic layer 22, pinned magnetic layer 24, nonmagnetic conductive layer 23, and conductive layers 26, respectively.

The thin film magnetic head 143 is manufactured by a method similar to the method of manufacturing the thin film magnetic head 133 of the fifth embodiment.

The method of manufacturing the thin film magnetic head 143 is mainly different from the method of manufacturing the thin film magnetic head 133 of the fifth embodiment in that the insulating layer 21, the free magnetic layer 52, the nonmagnetic conductive layer 73, the pinned magnetic layer 74 and the antiferromagnetic layer 75 are laminated in turn on the lower shield layer 12.

Namely, the insulating layer 21, the free magnetic layer 52, the nonmagnetic conductive layer 73, the pinned magnetic layer 74, and the antiferromagnetic layer 75 are laminated in turn on the lower shield layer 12. Then, a lift-off resist is formed on the antiferromagnetic layer 75. Next, both sides of the lift-off resist in the direction of the track width are etched to form the projection 12a in the lower shield layer 12, and to form the free magnetic layer 52, the nonmagnetic conductive layer 73, the pinned magnetic layer 74 and the antiferromagnetic layer 75 in a substantially trapezoidal sectional shape.

Next, the insulating bias layers 68, the ferromagnetic layers 29 and the conductive layers 76 are laminated in turn on the exposed portions of the lower shield layer and the lift-off resist. The lift-off resist is removed.

Then, the insulating layer 77 and the upper shield layer 13 are laminated in turn on the conductive layers 76 and the antiferromagnetic layer 75 to obtain the thin film magnetic head 143.

In the thin film magnetic head 143, the insulating bias layers 68 are arranged on both sides of the projection 12a of the lower shield layer 12 in the X1 direction to decrease the step of the insulating layer 77, thereby causing no step in the upper shield layer 13. For example, therefore, even when a gap layer 14 and an upper core layer 17 are laminated on the upper shield layer 13 to form the inductive head 4, no step occurs in the gap layer 14, thereby preventing warping of the shape of the write magnetic gap G1 of the inductive head 4.

Furthermore, in manufacturing the thin film magnetic head 143, the insulating bias layers 68 and the ferromagnetic layers 29 are laminated in turn to prevent the contamination of the interfaces therebetween with impurities. Therefore, the great exchange coupling magnetic field is exhibited in each of the interfaces between the insulating bias layers 68 and the ferromagnetic layers 29 so that the magnetization direction of the free magnetic layer 52 can securely be oriented in the direction of the track width by the exchange coupling magnetic field.

Furthermore, in the thin film magnetic head 143, the insulating bias layers 68 are partly arranged on both sides of the projection 12a in the direction of the track width. The conductive layers 76 are arranged on both sides of the antiferromagnetic layer 75 in the direction of the track width. Therefore, the spin-valve thin film magnetic element 144 can be thinned. The gap of the thin film magnetic head 143 can be narrowed to make the thin film magnetic head 143 adaptable to a higher magnetic recording density.

Furthermore, the insulating bias layers 68 are arranged between the lower shield layer 12 and the ferromagnetic layers 29. When the lower shield layer 12 is partly extended to cause a sag during polishing of the medium-facing surface to determine the gap depth, there is low probability that the sag reaches the ferromagnetic layers 29 across the insulating bias layers 68, thereby decreasing the probability of a short circuit between the lower shield layer 12 and the spin-valve thin film magnetic element 144.

Seventh Embodiment

Figure 20:
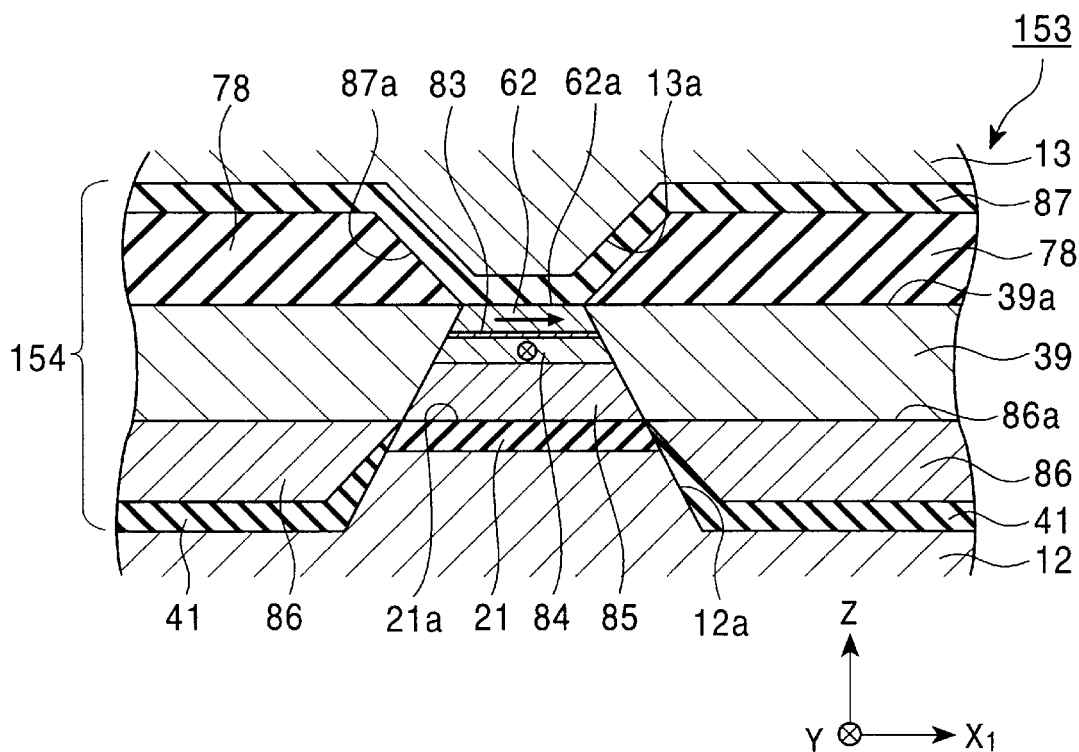
FIG. 20 is a sectional view of a thin film magnetic head in accordance with a seventh embodiment of the present invention, as viewed from the medium-facing surface side.

FIG. 20 is a sectional view of a thin film magnetic head 153 in accordance with a seventh embodiment of the present invention. In FIG. 20, the same components as those shown in FIGS. 1 to 4 are denoted by the same reference numerals. The description of these components is brief or omitted.

As shown in FIG. 20, like the above-mentioned thin film magnetic head 3, the thin film magnetic head 153 constitutes a floating magnetic head together with the inductive head 4

(see FIG. 4). The thin film magnetic head 153 comprises a spin-valve thin film magnetic element 154, and an upper shield layer 13 and a lower shield layer 12 laminated on both sides of the spin-valve thin film magnetic element 154 in the direction of the thickness thereof.

As shown in FIG. 20, a projection 12a is provided in the lower shield layer 12 to project toward the spin-valve thin film magnetic element 154 side. A projection 13a is provided in the upper shield layer 13 to project toward the spin-valve thin film magnetic element 154 side.

In FIG. 20, the Z direction is the movement direction of the magnetic recording medium. The Y direction is the direction of a leakage magnetic field from the magnetic recording medium. The X1 direction of the direction of the track width of the thin film magnetic head 153.

The spin-valve thin film magnetic element 154 is a bottom-type single spin-valve thin film magnetic element in which an antiferromagnetic layer 85, a pinned magnetic layer, a nonmagnetic conductive layer 83, and a free magnetic layer 62 are laminated in turn.

In the spin-valve thin film magnetic element 154, an insulating layer 21 is provided on a projection 12a of the lower shield layer 12. A pair of interlayer insulating layers 41 and a pair of conductive layer 86 are laminated in turn on both sides of the projection 12a and the insulating layer 21 in the X1 direction (both sides in the direction of the track width).

The interlayer insulating layers 41 are extended on the inclined surfaces of the projection 12a to contact the insulating layer 21.

The conductive layers 86 are laminated until the upper surfaces 86a (layer surfaces) and the upper surface (layer surface) 21a of the insulating layer 21 form the same plane.

The pair of the conductive layers 86 are arranged on both sides of the projection 12a of the lower shield layer 12 in the X1 direction shown in the drawing so that the conductive layers 86 are partly buried in the lower shield layer 12.

Furthermore, an antiferromagnetic layer 85, a pinned magnetic layer 84, a nonmagnetic conductive layer 83, and a free magnetic layer 62 are laminated in turn on the insulating layer 21. Each of these layers 85, 84, 83, and 62 has a substantially trapezoidal sectional shape having a width corresponding to the track width.

Furthermore, a pair of ferromagnetic layers 39 are arranged on the conductive layers 86 so as to be located on both sides of the antiferromagnetic layer 85, the pinned magnetic layer 84, the nonmagnetic conductive layer 83, and the free magnetic layer 62 in the X1 direction as shown in the drawing (both sides in the direction of the track width). Furthermore, insulating bias layers 78 are laminated on the ferromagnetic layers 39. The ferromagnetic layers 39 are laminated in contact with the insulating bias layers 78 so that the upper surfaces 39a and the upper surfaces 62a of the free magnetic layer 62 form the same plane.

Namely, the thickness of each of the ferromagnetic layers 39 is the same as the total thickness of the free magnetic layer 62, the nonmagnetic conductive layer 83, the pinned magnetic layer 84, and the antiferromagnetic layer 85.

Furthermore, an insulating layer 87 is laminated on the insulating bias layers 78 and the free magnetic layer 62. The upper shield layer 13 is laminated on the insulating layer 87.

As shown in FIG. 20, a projection 87a of the insulating layer 87 and the projection 13a of the upper shield layer 13 are located between the pair of the insulating bias layers 78. Namely, the insulating bias layers 78 are located on both sides of the projection 13a in the direction of the track width so as to be buried in the upper shield layer 13.

The insulating bias layers 78 are made of a material equivalent to the above-described insulating bias layers 28, and brought into contact with the ferromagnetic layers 39 so that an exchange coupling magnetic field (exchange anisotropic magnetic field) is exhibited in each of the interfaces between the insulating bias layers 78 and the ferromagnetic layers 39. Therefore, the magnetization direction of each of the ferromagnetic layers 39 is oriented in the X1 direction shown in the drawing by the exchange coupling magnetic field. Furthermore, a leakage magnetic field of each of the ferromagnetic layers 39 is applied to the free magnetic layer 62 to orient the magnetization direction of the free magnetic layer 62 in the X1 direction shown in the drawing.

The antiferromagnetic layer 85 is made of a material equivalent to the above-described antiferromagnetic layer 25, and brought into contact with the pinned magnetic layer 84 to exhibit the exchange coupling magnetic field (exchange anisotropic magnetic field) in the interface between the pinned magnetic layer 84 and the antiferromagnetic layer 85 so that the magnetization direction of the pinned magnetic layer 84 is pinned in the Y direction shown in the drawing.

As a result, the magnetization direction of the free magnetic layer 62 crosses the magnetization direction of the pinned magnetic layer 84.

The free magnetic layer 62, the pinned magnetic layer 84, the nonmagnetic conductive layer 83, and the conductive layers 86 are made materials equivalent to those of the above-described free magnetic layer 22, pinned magnetic layer 24, nonmagnetic conductive layer 23, and conductive layers 26, respectively.

The thin film magnetic head 153 is manufactured by a method similar to the method of manufacturing the thin film magnetic head 133 of the fifth embodiment.

The method of manufacturing the thin film magnetic head 153 is mainly different from the method of manufacturing the thin film magnetic head 133 of the fifth embodiment in that the conductive layers 86, the ferromagnetic layers 39 and the insulating bias layers 78 are laminated in turn after both sides of a lift-off resist is etched.

Namely, the insulating layer 21, the antiferromagnetic layer 85, the pinned magnetic layer 84, the nonmagnetic conductive layer 83, and the free magnetic layer 62 are laminated in turn on the lower shield layer 12. Then, a lift-off resist is formed on the free magnetic layer 62. Next, both sides of the lift-off resist in the direction of the track width are etched to form the projection 12a in the lower shield layer 12, and to form the antiferromagnetic layer 85, the pinned magnetic layer 84, the nonmagnetic conductive layer 83, and the free magnetic layer 62 in a substantially trapezoidal sectional shape.

Next, the conductive layers 86, the ferromagnetic layers 39, and the insulating bias layers 78 are laminated in turn on the portions of the lower shield layer, which are exposed by etching. The lift-off resist, and the lift-off resist is removed.

Then, the insulating layer 87 and the upper shield layer 13 are laminated in turn on the insulating bias layers 78 and the free magnetic layer 62 to obtain the thin film magnetic head 153.

In the thin film magnetic head 153, the pair of the conductive layers 86 are buried in the lower shield layer 12 and the insulating layer 21. Furthermore, the step of the insulating layer 87, which constitutes the upper surface of the spin-valve thin film magnetic element 154, corresponds to the thickness of the insulating bias layers 78. Therefore, this step is less than the step produced near the track portion G2 of a conventional thin film magnetic head.

Namely, the pair of the conductive layers 86 are arranged on both sides of the projection 12a of the lower shield layer 12 in the X1 direction to decrease the step of the insulating layer 87, thereby causing no step in the upper shield layer 13.

For example, therefore, even when a gap layer 14 and an upper core layer 17 are laminated on the upper shield layer 13 to form the inductive head 4, no step occurs in the gap layer 14, thereby preventing warping of the shape of the write magnetic gap G1 of the inductive head 4.

Furthermore, the conductive layers 86 are buried in the lower shield layer 12. The insulating bias layers 78 are buried in the upper shield layer 13. Therefore, even when the spin-valve thin film magnetic element 154 is thinned to narrow the gap with an increase in magnetic recording density, the insulating bias layers 78, and the conductive layers 86 need not be thinned. Thus, the magnetization direction of the free magnetic layer 62 can be securely oriented in one direction. The sensing current can efficiently be supplied to the free magnetic layer 62 to increase the sensitivity of the thin film magnetic head 153.

Furthermore, the insulating bias layers 78 are arranged between the upper shield layer 13 and the ferromagnetic layers 39. When the upper shield layer 13 is partly extended to cause a sag in polishing the medium-facing surface 7 to determine the gap depth, there is low probability that the sag reaches the ferromagnetic layers 39 across the insulating bias layers 78, thereby decreasing the probability of a short circuit between the upper shield layer 13 and the spin-valve thin film magnetic element 154.

Eighth Embodiment

Figure 21:
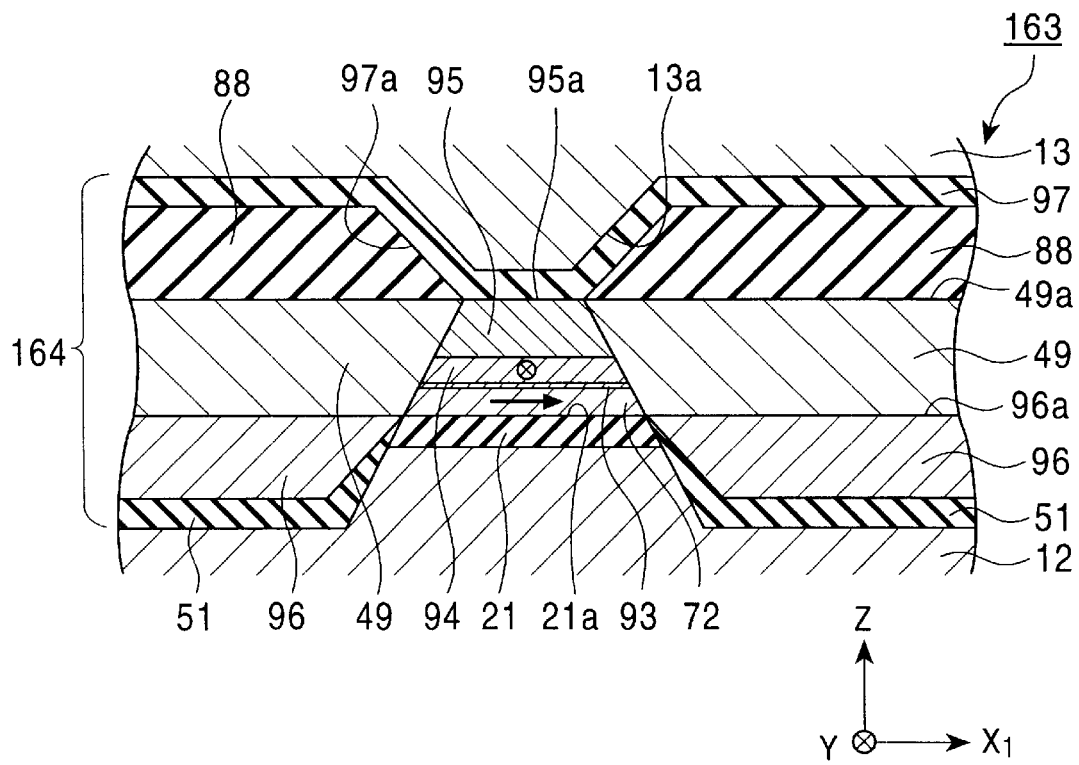
FIG. 21 is a sectional view of a thin film magnetic head in accordance with an eighth embodiment of the present invention, as viewed from the medium-facing surface side.

FIG. 21 is a sectional view of a thin film magnetic head 163 in accordance with an eighth embodiment of the present invention. In FIG. 21, the same components as those shown in FIGS. 1 to 4 are denoted by the same reference numerals. The description of these components is brief or omitted.

As shown in FIG. 21, like the above-mentioned thin film magnetic head 3, the thin film magnetic head 163 constitutes a floating magnetic head together with the inductive head 4 (see FIG. 4). The thin film magnetic head 163 comprises a spin-valve thin film magnetic element 164, and an upper shield layer 13 and a lower shield layer 12 laminated on both sides of the spin-valve thin film magnetic element 164 in the direction of the thickness thereof.

As shown in FIG. 21, a projection 12a is provided in the lower shield layer 12 to project toward the spin-valve thin film magnetic element 164 side. A projection 13a is provided in the upper shield layer 13 to project toward the spin-valve thin film magnetic element 164 side.

In FIG. 21, the Z direction is the movement direction of the magnetic recording medium. The Y direction is the direction of a leakage magnetic field from the magnetic recording medium. The X1 direction of the direction of the track width of the thin film magnetic head 163.

The spin-valve thin film magnetic element 164 is a top-type single spin-valve thin film magnetic element in which a free magnetic layer, a nonmagnetic conductive layer, a pinned magnetic layer, and an antiferromagnetic layer are laminated in turn.

In the spin-valve thin film magnetic element 164, an insulating layer 21 is provided on the projection 12a of the lower shield layer 12. A pair of interlayer insulating layers 51 and conductive layers 96 are laminated on both sides of the projection 12a and the insulating layer 21 in the X1 direction shown in the drawing (both side in the direction of the track width).

The interlayer insulating layers 51 are extended on the inclined surfaces of the projection 12a to contact the insulating layer 21.

The conductive layers 96 are laminated to a thickness with which the upper surfaces 96a (layer surfaces) and the upper surface (layer surface) 21a of the insulating layer 21 form the same plane.

The pair of the conductive layers 96 are arranged on both sides of the projection 12a of the lower shield layer 12 in the X1 direction shown in the drawing so that the conductive layers 96 are partly buried in the lower shield layer 12.

Furthermore, a free magnetic layer 72, a nonmagnetic conductive layer 93, a pinned magnetic layer 94, and an antiferromagnetic layer 95 are laminated in turn on the insulating layer 21. Each of these layers 72, 93, 94, and 95 has a substantially trapezoidal sectional shape having a width corresponding to the track width.

Furthermore, a pair of ferromagnetic layers 49 are arranged on the conductive layers 96 so as to be located on both sides of the free magnetic layer 72, the nonmagnetic conductive layer 93, the pinned magnetic layer 94, and the antiferromagnetic layer 95 in the X1 direction shown in the drawing (both sides in the direction of the track width). Furthermore, insulating bias layers 88 are laminated on the ferromagnetic layers 49. The ferromagnetic layers 49 are laminated in contact with the insulating bias layers 88 so that the upper surfaces 49a and the upper surfaces 95a of the antiferromagnetic layer 95 form the same plane.

Furthermore, an insulating layer 97 is laminated on the insulating bias layers 88 and the antiferromagnetic layer 95. The upper shield layer 13 is laminated on the insulating layer 97.

As shown in FIG. 21, a projection 97a of the insulating layer 97 and the projection 13a of the upper shield layer 13 are located between the pair of the insulating bias layers 88. Namely, the insulating bias layers 88 are located on both sides of the projection 13a of the upper shield layer 13 in the direction of the track width so that the insulating bias layers 88 are buried in the upper shield layer 13.

The insulating bias layers 88 are made of a material equivalent to the above-described insulating bias layers 28, and brought into contact with the ferromagnetic layers 49 so that an exchange coupling magnetic field (exchange anisotropic magnetic field) is exhibited in each of the interfaces between the insulating bias layers 88 and the ferromagnetic layers 49. Therefore, the magnetization direction of each of the ferromagnetic layers 49 is oriented in the X1 direction shown in the drawing by the exchange coupling magnetic field. Furthermore, a leakage magnetic field of each of the ferromagnetic layers 49 is applied to the free magnetic layer 72 to orient the magnetization direction of the free magnetic layer 72 in the X1 direction shown in the drawing.

The antiferromagnetic layer 95 is made of a material equivalent to the above-described antiferromagnetic layer 25, and brought into contact with the pinned magnetic layer 94 to exhibit the exchange coupling magnetic field (exchange anisotropic magnetic field) in the interface between the pinned magnetic layer 94 and the antiferromagnetic layer 95 so that the magnetization direction of the pinned magnetic layer 94 is pinned in the Y direction shown in the drawing.

As a result, the magnetization direction of the free magnetic layer 72 crosses the magnetization direction of the pinned magnetic layer 94.

The free magnetic layer 72, the pinned magnetic layer 94, the nonmagnetic conductive layer 93, and the conductive layers 96 are made of materials equivalent to those of the above-described free magnetic layer 22, pinned magnetic layer 24, nonmagnetic conductive layer 23, and conductive layers 26, respectively.

The thin film magnetic head 163 is manufactured by a method similar to the method of manufacturing the thin film magnetic head 133 of the fifth embodiment.

The method of manufacturing the thin film magnetic head 163 is mainly different from the method of manufacturing the thin film magnetic head 133 of the fifth embodiment in that the insulating layer 21, the free magnetic layer 72, the nonmagnetic conductive layer 93, the pinned magnetic layer 94 and the antiferromagnetic layer 95 are laminated in turn on the lower shield layer 12. The conductive layers 96, the ferromagnetic layers 94 and the insulating bias layers 88 are laminated in turn after both sides of a lift-off resist are etched.

Namely, the insulating layer 21, the free magnetic layer 72, the nonmagnetic conductive layer 93, the pinned magnetic layer 94, and the antiferromagnetic layer 95 are laminated in turn on the lower shield layer 12. Then, a lift-off resist is formed on the antiferromagnetic layer 95. Next, both sides of the lift-off resist in the direction of the track width are etched to form the projection 12a in the lower shield layer 12, and to form the free magnetic layer 72, the nonmagnetic conductive layer 93, the pinned magnetic layer 94 and the antiferromagnetic layer 95 in a substantially trapezoidal sectional shape.

Next, the conductive layers 96, the ferromagnetic layers 49, and the insulating bias layers 88 are laminated in turn on the exposed portions of the lower shield layer and the lift-off resist. The lift-off resist is removed.

Then, the insulating layer 97 and the upper shield layer 13 are laminated in turn on the insulating bias layers 88 and the antiferromagnetic layer 95 to obtain the thin film magnetic head 143.

In the thin film magnetic head 163, the same effects as the thin film magnetic head 153 of the seventh embodiment are obtained.

Ninth Embodiment

Figure 22:
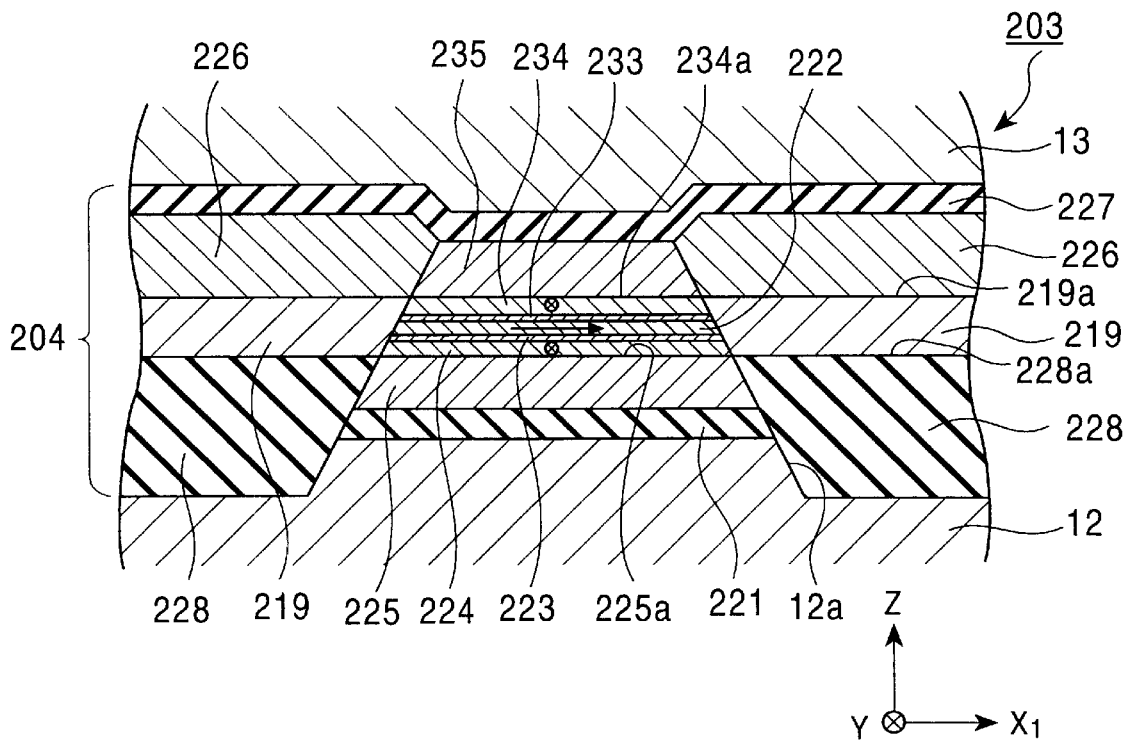
FIG. 22 is a sectional view of a thin film magnetic head in accordance with a ninth embodiment of the present invention, as viewed from the medium-facing surface side.

FIG. 22 is a sectional view of a thin film magnetic head 203 in accordance with a ninth embodiment of the present invention. In FIG. 22, the same components as those shown in FIGS. 1 to 4 are denoted by the same reference numerals. The description of these components is brief or omitted.

As shown in FIG. 22, like the above-mentioned thin film magnetic head 3, the thin film magnetic head 203 is provided on a slider 2 to constitute a floating magnetic head together with the inductive head 4 (see FIGS. 2 and 4). The thin film magnetic head 203 comprises a spin-valve thin film magnetic element 204, and an upper shield layer 13 and a lower shield layer 12 laminated on both sides of the spin-valve thin film magnetic element 204 in the direction of the thickness thereof.

As shown in FIG. 22, a projection 12a is provided in the lower shield layer 12 to project toward the spin-valve thin film magnetic element 204 side.

In FIG. 22, the Z direction is the movement direction of the magnetic recording medium. The Y direction is the direction of a leakage magnetic field from the magnetic recording medium. The X1 direction of the direction of the track width of the thin film magnetic head 203.

The spin-valve thin film magnetic element 204 is a dual spin-valve thin film magnetic element in which a nonmagnetic conductive layer, a pinned magnetic layer and an antiferromagnetic layer are laminated on either side of a free magnetic layer in the direction of the thickness.

In the spin-valve thin film magnetic element 204, an insulating layer 221 and an antiferromagnetic layer 225 are provided on the projection 12a of the lower shield layer 12. A pair of insulating bias layers 228 are arranged on both sides of the projection 12a, the insulating layer 221, and the antiferromagnetic layer 225 in the X1 direction shown in FIG. 22 (on both sides in the direction of the track width).

The insulating bias layers 228 are laminated to a thickness with which the upper surfaces 228a (layer surfaces) of the insulating bias layers 228 and the upper surface (layer surface) 225a of the antiferromagnetic layer 225 form the same plane.

The pair of the insulating bias layers 228 are arranged on both sides of the projection 12a of the lower shield layer 12 in the X1 direction so that the insulating layers 228 are partly buried in the lower shield layer 12.

A pinned magnetic layer 224, a nonmagnetic conductive layer 223, a free magnetic layer 222, a nonmagnetic conductive layer 233, a pinned magnetic layer 234 and an antiferromagnetic layer 235 are laminated in turn on the antiferromagnetic layer 225. Each of these layers 225, 224, 223, 222, 233, 234, and 235 has a substantially trapezoidal sectional shape having a width corresponding to the track width.

Furthermore, a pair of ferromagnetic layers 219 are laminated on the insulating bias layers 228 so as to be located on both sides (both sides in the track width direction) of the pinned magnetic layers 224 and 234, the nonmagnetic conductive layers 223 and 233, and the free magnetic layer 222 in the X1 direction. The ferromagnetic layers 219 are laminated so that the upper surfaces 219a and the upper surface 234a of the pinned magnetic layer 234 form the same plane. Therefore, the thickness of each of the ferromagnetic layers 219 is the same as the total thickness of the pinned magnetic layers 224 and 234, the nonmagnetic conductive layers 223 and 233, and the free magnetic layer 222.

Furthermore, a pair of conductive layers 226 are laminated on the ferromagnetic layers 219 so as to be located on both sides of the antiferromagnetic layer 235 in the X1 direction shown in the drawing (both side in the direction of the track width).

Furthermore, an insulating layer 227 is laminated on the conductive layers 226 and the antiferromagnetic layer 235, and the upper shield layer 13 is laminated on the insulating layer 227.

The insulating bias layers 228 are made of a material equivalent to the above-described insulating bias layers 28, and are brought into contact with the ferromagnetic layers 219 so that an exchange coupling magnetic field (exchange anisotropic magnetic field) is exhibited in each of the interfaces between the insulating bias layers 228 and the ferromagnetic layers 219. Therefore, the magnetization direction of each of the ferromagnetic layers 219 is oriented in the X1 direction shown in the drawing by the exchange coupling magnetic field. Also, the leakage magnetic field from each of the ferromagnetic layers 219 is applied to the free magnetic layer 222 to orient the magnetization direction of the free magnetic layer 222 in the X1 direction.

The antiferromagnetic layers 225 and 235 are made of a material equivalent to the above-described antiferromagnetic layer 25, and brought into contact with the pinned magnetic layers 224 and 234, respectively, to exhibit the exchange coupling magnetic field (exchange anisotropic magnetic field) in each of the interfaces between the pinned magnetic layers 224 and 234 and the antiferromagnetic layers 225 and 235 so that the magnetization direction of each of the pinned magnetic layers 224 and 234 is pinned in the Y direction shown in the drawing.

As a result, the magnetization direction of the free magnetic layer 222 crosses the magnetization direction of each of the pinned magnetic layers 224 and 234.

The free magnetic layer 222, the pinned magnetic layers 224 and 234, the nonmagnetic conductive layers 223 and 233, and the conductive layers 226 are made materials equivalent to those of the above-described free magnetic layer 22, pinned magnetic layer 24, nonmagnetic conductive layer 23, and conductive layers 26, respectively.

In a giant magnetoresistive effect generating mechanism having a structure in which the nonmagnetic conductive layers 223 and 233 are respectively held between the pinned magnetic layers 224 and 234 and the free magnetic layers 222, if the pinned magnetic layers 224 and 234 and the free magnetic layer 222 are made of the same material, there is a low probability of causing a factor other than spin-dependent scanning of conduction electrons. The same material permits the achievement of the high magnetoresistive effect, as compared with those layers made of different materials.

In the thin film magnetic head 203, the magnetization direction of the free magnetic layer 222 is changed by a leakage magnetic field from the recording medium such as a hard disk. The magnetizations of the pinned magnetic layers 224 and 234 are pinned in the Y direction as shown in the drawing. The changed magnetization direction of the free magnetic layer 222 changes the electric resistance of the spin-valve thin film magnetic element 204. Therefore, the voltage is changed based on the change in electric resistance value to detect the leakage magnetic field from the recording medium.

The thin film magnetic head 203 is manufactured by a method similar to the method of manufacturing as the thin film magnetic head 133 of the fifth embodiment.

The method of manufacturing the thin film magnetic head 203 is mainly different from the method of manufacturing the thin film magnetic head 133 of the fifth embodiment in that the insulating layer 221, the antiferromagnetic layer 225, the pinned magnetic layer 224, the nonmagnetic conductive layer 223, the free magnetic layer 222, the nonmagnetic conductive layer 233, the pinned magnetic layer 234 and the antiferromagnetic layer 235 are laminated in turn on the lower shield layer 12.

Namely, the insulating layer 221, the antiferromagnetic layer 225, the pinned magnetic layer 224, the nonmagnetic conductive layer 223, the free magnetic layer 222, the nonmagnetic conductive layer 233, the pinned magnetic layer 234 and the antiferromagnetic layer 235 are laminated in turn on the lower shield layer 12. A lift-off resist is formed on the antiferromagnetic layer 235. Both sides of the lift-off resist in the direction of the track width are etched to form the projection 12a in the lower shield layer 12, and to form the insulating layer 221, the antiferromagnetic layers 225 and 235, the pinned magnetic layers 224 and 234, the nonmagnetic conductive layers 223 and 233 and the free magnetic layer 222 in a substantially trapezoidal sectional shape.

Next, the insulating bias layers 228, the terromagnetic layers 219 and the conductive layers 226 are laminated in turn on the portions of the lower shield layer, which are exposed by etching, and the lift-off resist. The lift-off resist is removed.

Then, the insulating layer 227 and the upper shield layer 13 are further laminated on the conductive layers 226 and the antiferromagnetic layer 235 to obtain the thin film magnetic head 203.

In the thin film magnetic head 203, the insulating bias layers 228 are arranged on both sides of the projection 12a of the lower shield layer 12 in the X1 direction to decrease the step of the insulating layer 227, thereby causing no step in the upper shield layer 13. For example, therefore, even when the gap layer 14 and the upper core layer 17 are laminated on the upper shield layer 13 to form the inductive head 4, no step occurs in the gap layer 14, thereby preventing warping of the shape of the write magnetic gap G1 of the inductive head 4.

Furthermore, in manufacturing the thin film magnetic head 203, the insulating bias layers 228 and the ferromagnetic layers 219 are laminated in turn to prevent the contamination of the interfaces therebetween with impurities. Therefore, the great exchange coupling magnetic field is exhibited in each of the interfaces between the insulating bias layers 228 and the ferromagnetic layers 219 so that the magnetization direction of the free magnetic layer 222 can be securely oriented in the direction of the track width by the exchange coupling magnetic field.

The insulating bias layers 228 are arranged between the lower shield layer 12 and the ferromagnetic layers 219. When the lower shield layer 12 is partly extended to cause a sag during polishing of the medium-facing surface 7 to determine the gap depth, there is low probability that the sag reaches the ferromagnetic layers 219 across the insulating bias layers 228, thereby decreasing the probability of a short circuit between the lower shield layer 12 and the spin-valve thin film magnetic element 204.

In the thin film magnetic head 203, the pair of the insulating bias layers 228 are partly arranged on both sides of the projection 12a in the direction of the track width. The conductive layers 226 are arranged on both sides of the antiferromagnetic layer 235 in the direction of the track width. The spin-valve thin film magnetic element 204 can be thinned, and the gap of the thin film magnetic head 203 can be narrowed to make the thin film magnetic element adaptable to higher magnetic recording density.

Tenth Embodiment

Figure 23:
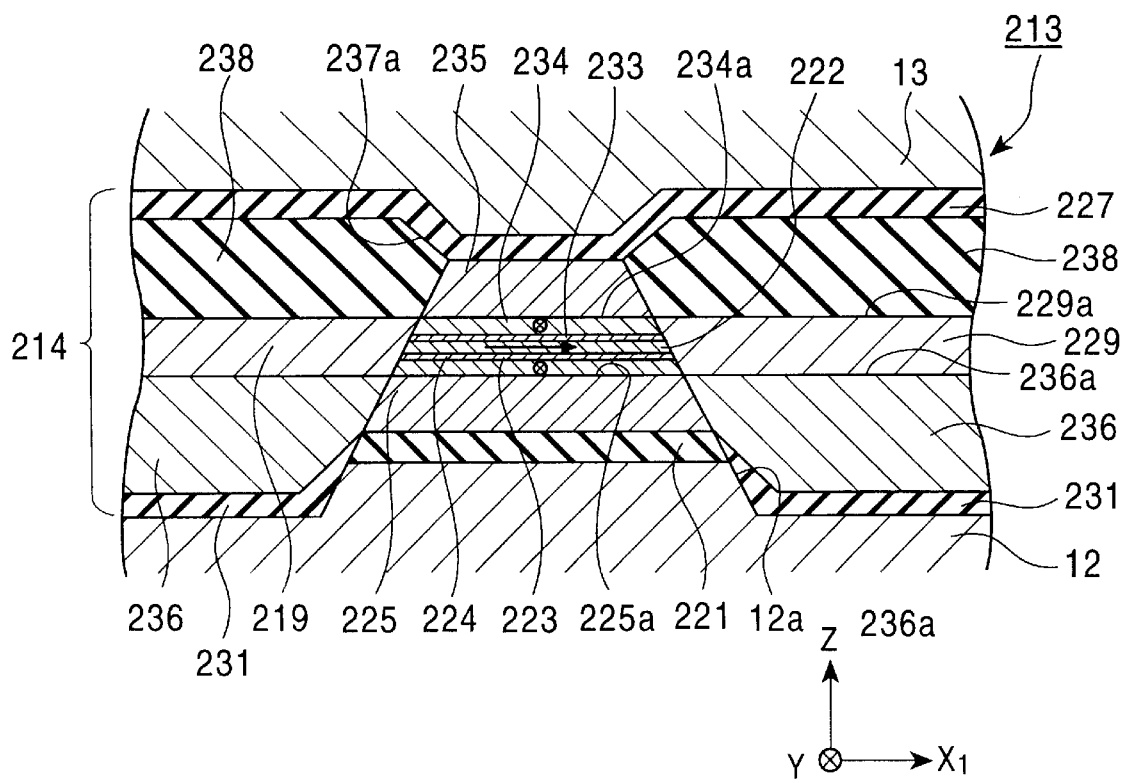
FIG. 23 is a sectional view of a thin film magnetic head in accordance with a tenth embodiment of the present invention, as viewed from the medium-facing surface side.

FIG. 23 is a sectional view of a thin film magnetic head 213 in accordance with a tenth embodiment of the present invention. In FIG. 23, the same components as those shown in FIGS. 1 to 4 are denoted by the same reference numerals. The description of these components is brief or omitted.

As shown in FIG. 23, like the above-mentioned thin film magnetic head 3, the thin film magnetic head 213 constitutes a floating magnetic head together with the inductive head 4 (see FIG. 4). The thin film magnetic head 213 comprises a spin-valve thin film magnetic element 214, and an upper shield layer 13 and a lower shield layer 12 laminated on both sides of the spin-valve thin film magnetic element 214 in the direction of the thickness thereof.

As shown in FIG. 23, a projection 12a is provided in the lower shield layer 12 to project toward the spin-valve thin film magnetic element 214 side. A projection 13a is provided in the upper shield layer 13 to project toward the spin-valve thin film magnetic element 214 side.

In FIG. 23, the Z direction is the movement direction of the magnetic recording medium. The Y direction is the direction of a leakage magnetic field from the magnetic recording medium. The X1 direction of the direction of the track width of the thin film magnetic head 213.

The spin-valve thin film magnetic element 214 is a so-called dual spin-valve thin film magnetic element in which a nonmagnetic conductive layer, a pinned magnetic layer and an antiferromagnetic layer are laminated on either side of a free magnetic layer in the direction of the thickness.

In the spin-valve thin film magnetic element 214, an insulating layer 221 and an antiferromagnetic layer 225 are provided on the projection 12a of the lower shield layer 12. A pair of interlayer insulating layers 231, and a pair of conductive layers 236 are arranged on both sides of the projection 12a, the insulating layer 221, and the antiferromagnetic layer 225 in the X1 direction shown in FIG. 23 (on both sides in the direction of the track width).

The interlayer insulating layers 231 are extended on the inclined surfaces of the projection 12a to contact the insulating layer 221.

The conductive layers 236 are laminated until the upper surfaces 236a (layer surfaces) and the upper surface (layer surface) 225a of the antiferromagnetic layer 225 form the same plane.

The pair of the conductive layers 236 are arranged on both sides of the projection 12a of the lower shield layer 12 in the X1 direction shown in the drawing so that the conductive layers 236 are partly buried in the lower shield layer 12.

A pinned magnetic layer 224, a nonmagnetic conductive layer 223, a free magnetic layer 222, a nonmagnetic conductive layer 233, a pinned magnetic layer 234 and an antiferromagnetic layer 235 are laminated in turn on the antiferromagnetic layer 225. Each of these layers 225, 224, 223, 222, 233, 234, and 235 has a substantially trapezoidal sectional shape having a width corresponding to the track width.

Furthermore, a pair of ferromagnetic layers 229 are laminated on the conductive layers 236 so as to be located on both sides (both sides in the track width direction) of the pinned magnetic layers 224 and 234, the nonmagnetic conductive layers 223 and 233, and the free magnetic layer 222 in the X1 direction. The ferromagnetic layers 229 are laminated so that the upper surfaces 229a and the upper surface 234a of the pinned magnetic layer 234 form the same plane. Therefore, the thickness of each of the ferromagnetic layers 229 is the same as the total thickness of the pinned magnetic layers 224 and 234, the nonmagnetic conductive layers 223 and 233, and the free magnetic layer 222.

Furthermore, a pair of insulating bias layers 238 are laminated on the ferromagnetic layers 229 so as to be located on both sides of the antiferromagnetic layer 235 in the X1 direction shown in the drawing (both side in the direction of the track width).

Furthermore, an insulating layer 237 is laminated on the insulating bias layers 238 and the antiferromagnetic layer 235. The upper shield layer 13 is laminated on the insulating layer 237.

As shown in FIG. 23, a projection 237a of the insulating layer 237 and the projection 13a of the upper shield layer 13 are located between the pair of the insulating bias layers 238. Namely, the insulating bias layers 238 are located on both sides of the projection 13a in the direction of the track width so as to be buried in the upper shield layer 13.

The insulating bias layers 238 are made of a material equivalent to the above-described insulating bias layers 28, and are brought into contact with the ferromagnetic layers 229 so that an exchange coupling magnetic field (exchange anisotropic magnetic field) is exhibited in each of the interfaces between the insulating bias layers 238 and the ferromagnetic layers 229. Therefore, the magnetization direction of each of the ferromagnetic layers 229 is oriented in the X1 direction shown in the drawing by the exchange coupling magnetic field. Also, the leakage magnetic field from each of the ferromagnetic layers 229 is applied to the free magnetic layer 222 to orient the magnetization direction of the free magnetic layer 22 in the X1 direction.

The antiferromagnetic layers 225 and 235 are made of a material equivalent to the above-described antiferromagnetic layer 25, and brought into contact with the pinned magnetic layers 224 and 234, respectively, to exhibit the exchange coupling magnetic field (exchange anisotropic magnetic field) in each of the interfaces between the pinned magnetic layers 224 and 234 and the antiferromagnetic layers 225 and 235 so that the magnetization direction of each of the pinned magnetic layers 224 and 234 is pinned in the Y direction shown in the drawing.

As a result, the magnetization direction of the free magnetic layer 222 crosses the magnetization direction of each of the pinned magnetic layers 224 and 234.

The thin film magnetic head 213 is manufactured by a method similar to the method of manufacturing as the thin film magnetic head 133 of the fifth embodiment.

The method of manufacturing the thin film magnetic head 213 is mainly different from the method of manufacturing the thin film magnetic head 133 of the fifth embodiment in that the insulating layer 221, the antiferromagnetic layer 225, the pinned magnetic layer 224, the nonmagnetic conductive layer 223, the free magnetic layer 222, the nonmagnetic conductive layer 233, the pinned magnetic layer 234 and the antiferromagnetic layer 235 are laminated in turn on the lower shield layer 12. The conductive layers 236, the ferromagnetic layers 229 and the insulating bias layers 238 are laminated in turn after both sides of a lift-off resist are etched.

Namely, the insulating layer 221, the antiferromagnetic layer 225, the pinned magnetic layer 224, the nonmagnetic conductive layer 223, the free magnetic layer 222, the nonmagnetic conductive layer 233, the pinned magnetic layer 234 and the antiferromagnetic layer 235 are laminated in turn on the lower shield layer 12. The lift-off resist is formed on the antiferromagnetic layer 235. Both sides of the lift-off resist in the direction of the track width are etched to form the projection 12a in the lower shield layer 12, and to form the insulating layer 221, the antiferromagnetic layers 225 and 235, the pinned magnetic layers 224 and 234, the nonmagnetic conductive layers 223 and 233 and the free magnetic layer 222 in a substantially trapezoidal sectional shape.

Next, the interlayer insulating layers 231, the conductive layers 236, the ferromagnetic layers 229, and the insulating bias layers 238 are laminated in turn on the portions of the lower shield layer, which are exposed by etching, and the lift-off resist. The lift-off resist is removed.

Then, the insulating layer 237 and the upper shield layer 13 are further laminated on the insulating bias layers 238 and the antiferromagnetic layer 235 to obtain the thin film magnetic head 213.

In the thin film magnetic head 213, the pair of the conductive layers 236 are partly buried in the lower shield layer 12. The step formed in the insulating layer 237, which constitutes the upper surface of the spin-valve thin film magnetic element 214, can be decreased, as compared with that produced near the track portion G2 of the conventional thin film magnetic head. Therefore, no step occurs in the upper shield layer 13.

For example, therefore, even when the gap layer 14 and the upper core layer 17 are laminated on the upper shield layer 13 to form the inductive head 4, no step occurs in the gap layer 14, thereby preventing warping of the shape of the write magnetic gap G1 of the inductive head 4.

The insulating bias layers 238 are arranged between the upper shield layer 13 and the ferromagnetic layers 229. When the upper shield layer 13 is partly extended to cause a sag during polishing of the medium-facing surface 7 to determine the gap depth, there is low probability that the sag reaches the ferromagnetic layers 229 across the insulating bias layers 238, thereby decreasing the probability of a short circuit between the upper shield layer 13 and the spin-valve thin film magnetic element 214.

In addition, the pair of the conductive layers 236 are partly buried in the lower shield layer 12. The pair of the insulating bias layers 238 are buried in the upper shield layer 13. When the spin-valve thin film magnetic element 214 is thinned to narrow the gap with an increase in the magnetic recording density, the insulating bias layers 238, and the conductive layers 236 need not be thinned. Therefore, the magnetization direction of the free magnetic layer 222 can securely be oriented in one direction. The sensing current can efficiently be supplied to the free magnetic layer 222, thereby increasing the sensitivity of the thin film magnetic head 213.

Furthermore, in the thin film magnetic head 213, the pair of the insulating bias layers 238 are partly arranged on both sides of the projection 13a of the upper shield layer 13 in the direction of the track width. The conductive layers 236 are partly arranged on both sides of the projection 12a of the lower shield layer 12 in the direction of the track width. The spin-valve thin film magnetic element 214 can be thinned. The gap of the thin film magnetic head 213 can be narrowed to make the thin film magnetic head 213 adaptable to higher magnetic recording density.

Eleventh Embodiment

Figure 24:
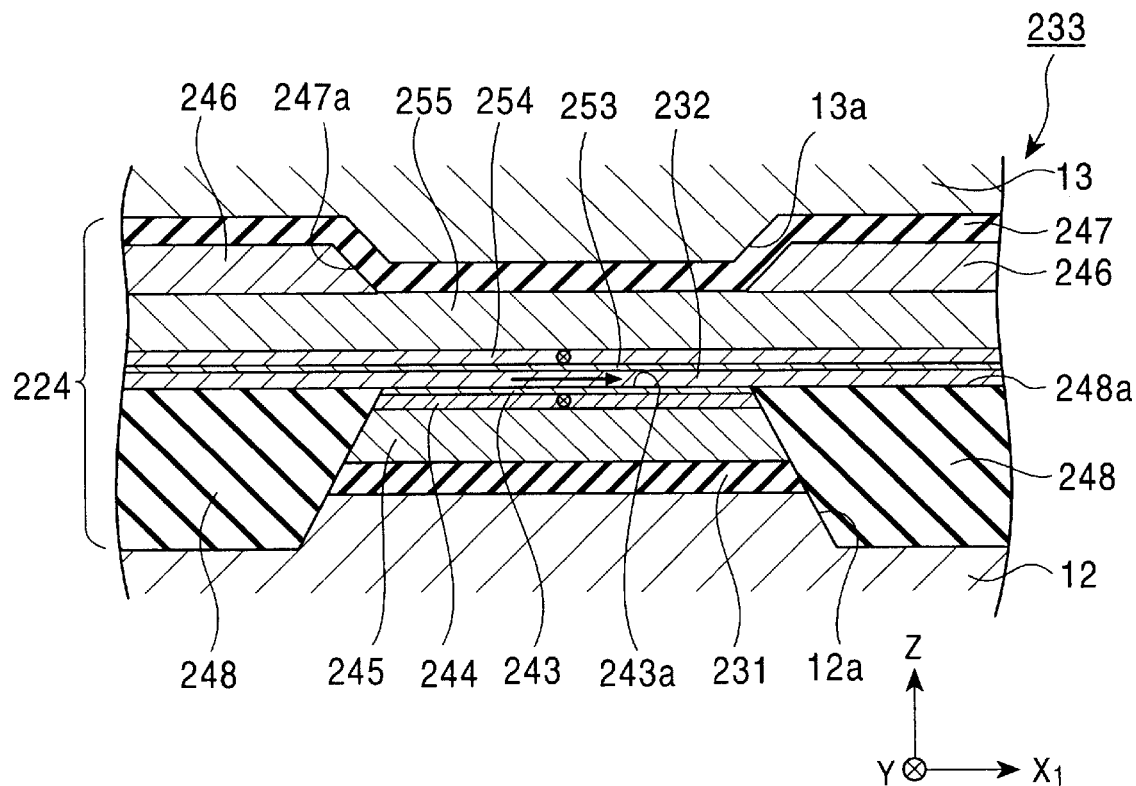
FIG. 24 is a sectional view of a thin film magnetic head in accordance with an eleventh embodiment of the present invention, as viewed from the medium-facing surface side.

FIG. 24 is a sectional view of a thin film magnetic head 223 in accordance with an eleventh embodiment of the present invention. In FIG. 24, the same components as those shown in FIGS. 1 to 4 are denoted by the same reference numerals. The description of these components is brief or omitted.

As shown in FIG. 24, like the above-mentioned thin film magnetic head 3, the thin film magnetic head 223 constitutes a floating magnetic head together with the inductive head 4 (see FIG. 4). The thin film magnetic head 223 comprises a spin-valve thin film magnetic element 224, and an upper shield layer 13 and a lower shield layer 12 laminated on both sides of the spin-valve thin film magnetic element 224 in the direction of the thickness thereof.

As shown in FIG. 24, a projection 12a is provided in the lower shield layer 12 to project toward the spin-valve thin film magnetic element 224 side. A projection 13a is provided in the upper shield layer 13 to project toward the spin-valve thin film magnetic element 224 side.

In FIG. 24, the Z direction is the movement direction of the magnetic recording medium. The Y direction is the direction of a leakage magnetic field from the magnetic recording medium. The X1 direction of the direction of the track width of the thin film magnetic head 223.

The spin-valve thin film magnetic element 224 is a dual spin-valve thin film magnetic element in which a nonmagnetic conductive layer, a pinned magnetic layer and an antiferromagnetic layer are laminated on either side of a free magnetic layer in the direction of the thickness.

In the spin-valve thin film magnetic element 224, an insulating layer 231, an antiferromagnetic layer 245, a pinned magnetic layer 244, and a nonmagnetic conductive layer 243 are laminated on the projection 12a of the lower shield layer 12. A pair of insulating bias layers 248 are arranged on both sides of the projection 12a, the insulating layer 231, the antiferromagnetic layer 245, the pinned magnetic layer 244 and the nonmagnetic conductive layer 243 in the X1 direction shown in FIG. 24 (on both sides in the direction of the track width).

Each of the insulating layer 231, the antiferromagnetic layer 245, the pinned magnetic layer 244, and the nonmagnetic conductive layer 243 has a substantially trapezoidal sectional shape.

The insulating bias layers 248 are laminated until the upper surfaces 248a (layer surfaces) and the upper surface (layer surface) 243a of the nonmagnetic conductive layer 243 form the same plane.

The pair of the insulating bias layers 248 are arranged on both sides of the projection 12a of the lower shield layer 12 in the X1 direction shown in the drawing so that the insulating bias layers 248 are partly buried in the lower shield layer 12.

A free magnetic layer 232, a nonmagnetic conductive layer 253, a pinned magnetic layer 254, and an antiferromagnetic layer 255 are laminated in turn on the insulating bias layers 248 and the nonmagnetic conductive layer 243.

Furthermore, a pair of conductive layers 246 are laminated on the antiferromagnetic layer 255 so as to be spaced in the X1 direction shown in FIG. 24.

Furthermore, an insulating layer 247 is laminated on the conductive layers 246 and the antiferromagnetic layer 255. The upper shield layer 13 is laminated on the insulating layer 247.

As shown in FIG. 24, a projection 247a of the insulating layer 247 and the projection 13a of the upper shield layer 13 are located between the pair of the conductive layers 246. Namely, the conductive layers 246 are located on both sides of the projection 13a in the direction of the track width so as to be buried in the upper shield layer 13.

The insulating bias layers 248 are made of a material equivalent to the above-described insulating bias layers 28, and are brought into contact with the free magnetic layer 232 so that an exchange coupling magnetic field (exchange anisotropic magnetic field) is exhibited in each of the interfaces between the insulating bias layers 248 and the free magnetic layer 232. Therefore, the magnetization direction of the free magnetic layer 232 is oriented in the X1 direction shown in the drawing by the exchange coupling magnetic field.

The antiferromagnetic layers 245 and 255 are made of a material equivalent to the above-described antiferromagnetic layer 25, and brought into contact with the pinned magnetic layers 244 and 254, respectively, to exhibit the exchange coupling magnetic field (exchange anisotropic magnetic field) in each of the interfaces between the pinned magnetic layers 244 and 254 and the antiferromagnetic layers 245 and 255 so that the magnetization direction of each of the pinned magnetic layers 244 and 254 is pinned in the Y direction shown in the drawing.

As a result, the magnetization direction of the free magnetic layer 232 crosses the magnetization direction of each of the pinned magnetic layers 244 and 254.

The free magnetic layer 232, the pinned magnetic layers 244 and 254, the nonmagnetic conductive layers 243 and 253, and the conductive layers 246 are made of materials equivalent to those of the above-described free magnetic layer 22, pinned magnetic layer 24, nonmagnetic conductive layer 23, and conductive layer 26, respectively.

The method of manufacturing the thin film magnetic head 223 is described below with reference to FIGS. 25 to 29.

Figure 25:
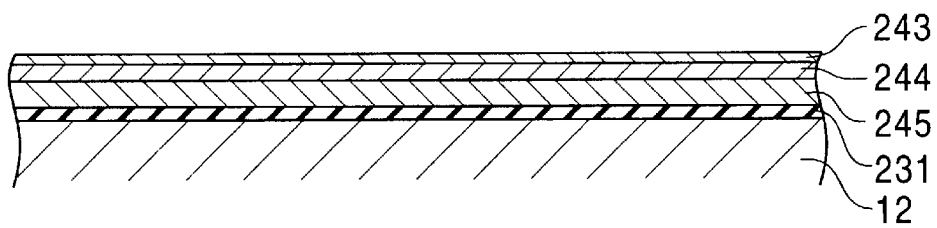
FIG. 25 shows the lamination of various layers according to a method of manufacturing the thin film magnetic head shown in FIG. 24.

As shown in FIG. 25, the insulating layer 231, the antiferromagnetic layer 245, the pinned magnetic layer 244, and the nonmagnetic conductive layer 243 are first laminated on the lower shield layer 12.

Figure 26:
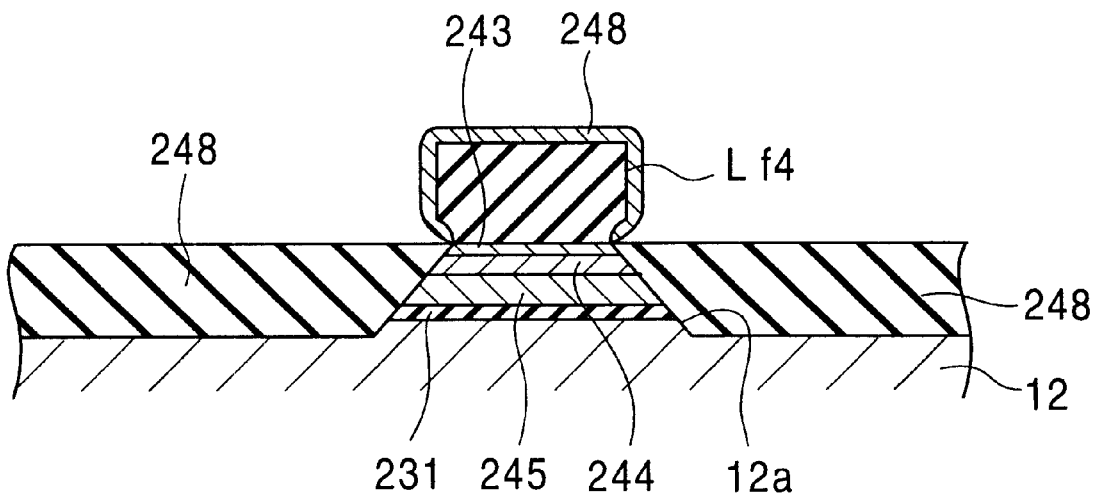
FIG. 26 shows the formation and etching of a lift-off resist according to a method of manufacturing the thin film magnetic head shown in FIG. 24.

Next, as shown in FIG. 26, a lift-off resist Lf4 is formed on the nonmagnetic conductive layer 243. Both sides of the lift-off resist Lf4 are etched to the depth of the top of the lower shield layer 12 by an ion milling method (physical ion beam etching) to form the projection 12a, and form the insulating layer 231, the antiferromagnetic layer 245, the pinned magnetic layer 244, and the nonmagnetic conductive layer 243 in a substantially trapezoidal sectional shape. The insulating bias layers 248 are laminated on the lift-off resist Lf4 and on the lower shield layer adjacent to the trapezoidal sectional shape.

Figure 27:
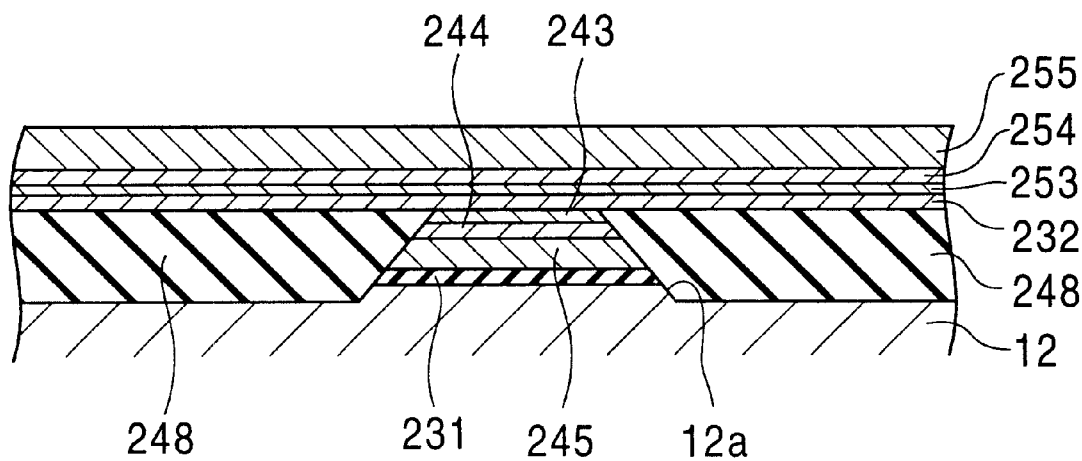
FIG. 27 shows the formation of a various layers according to a method of manufacturing the thin film magnetic head shown in FIG. 24.

Next, as shown in FIG. 27, the lift-off resist Lf4 is removed. The free magnetic layer 232, the nonmagnetic conductive layer 253, the pinned magnetic layer 254 and the antiferromagnetic layer 255 are laminated. In this way, the pair of insulating bias layers 248 are formed.

Figure 28:
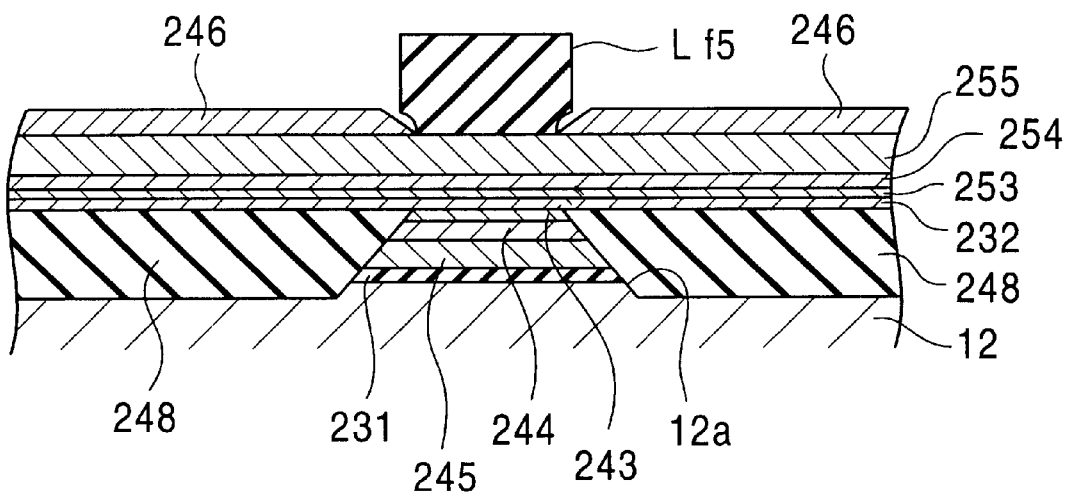
FIG. 28 shows the formation of a lift-off resist and lamination of several layers according to a method of manufacturing the thin film magnetic head shown in FIG. 24.

Next, as shown in FIG. 28, a lift-off resist Lf5 is formed on the antiferromagnetic layer 255. The conductive layers 246 are laminated on the lift-off resist Lf5 and both sides thereof.

Figure 29:
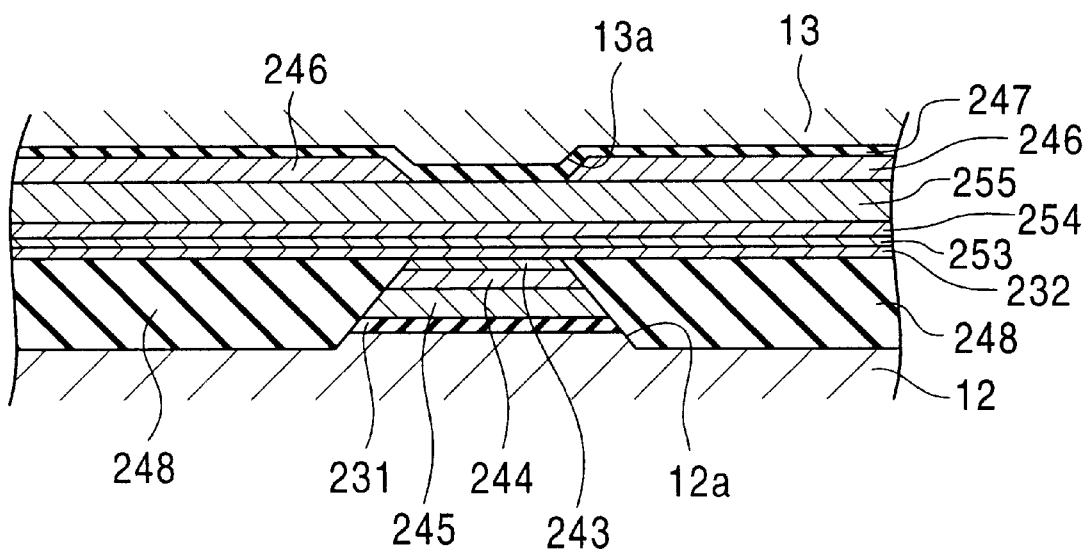
FIG. 29 shows the removal of a lift-off resist and the lamination of various layers according to a method of manufacturing the thin film magnetic head shown in FIG. 24.

Finally, as shown in FIG. 29, the lift-off resist Lf5 is removed. The insulating layer 247 and the upper shield layer 13 are laminated in turn to obtain the thin film magnetic head 223.

In the thin film magnetic head 223, the pair of the insulating bias layers 248 are partly buried in the lower shield layer 12. The conductive layers 246 are buried in the upper shield layer 13. The step formed in the insulating layer 247, which constitutes the upper surface of the spin-valve thin film magnetic element 224, can be decreased, as compared with that produced near the track portion G2 of the conventional thin film magnetic head. Therefore, no step occurs in the upper shield layer 13. For example, therefore, even when the gap layer 14 and the upper core layer 17 are laminated on the upper shield layer 13 to form the inductive head 4, no step occurs in the gap layer 14, thereby preventing warping of the shape of the write magnetic gap G1.

The insulating bias layers 248 are arranged between the lower shield layer 12 and the free magnetic layer 232. When the lower shield layer 12 is partly extended to cause a sag during polishing of the medium-facing surface 7 to determine the gap depth, there is low probability that the sag reaches the free magnetic layer 232 across the insulating bias layers 248, thereby decreasing the probability of a short circuit between the lower shield layer 12 and the spin-valve thin film magnetic element 224.

In addition, the pair of the insulating bias layers 248 are partly buried in the lower shield layer 12. When the spin-valve thin film magnetic element 224, and the insulating layers 231 and 247 are thinned to narrow the gap with an increase in the magnetic recording density, the insulating bias layers 248 need not be thinned. Therefore, the magnetization direction of the free magnetic layer 232 can be securely oriented in one direction.

Twelfth Embodiment

Figure 30:
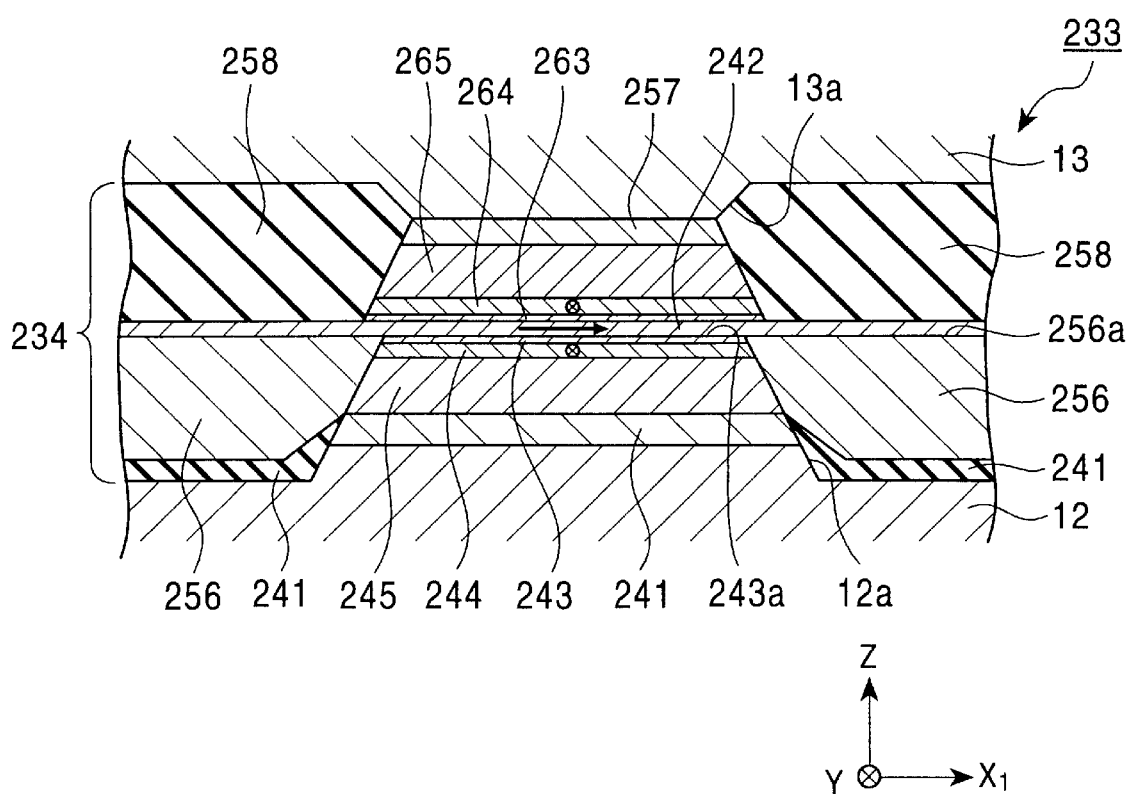
FIG. 30 is a sectional view of a thin film magnetic head in accordance with a twelfth embodiment of the present invention, as viewed from the medium-facing surface side.
Figure 31:
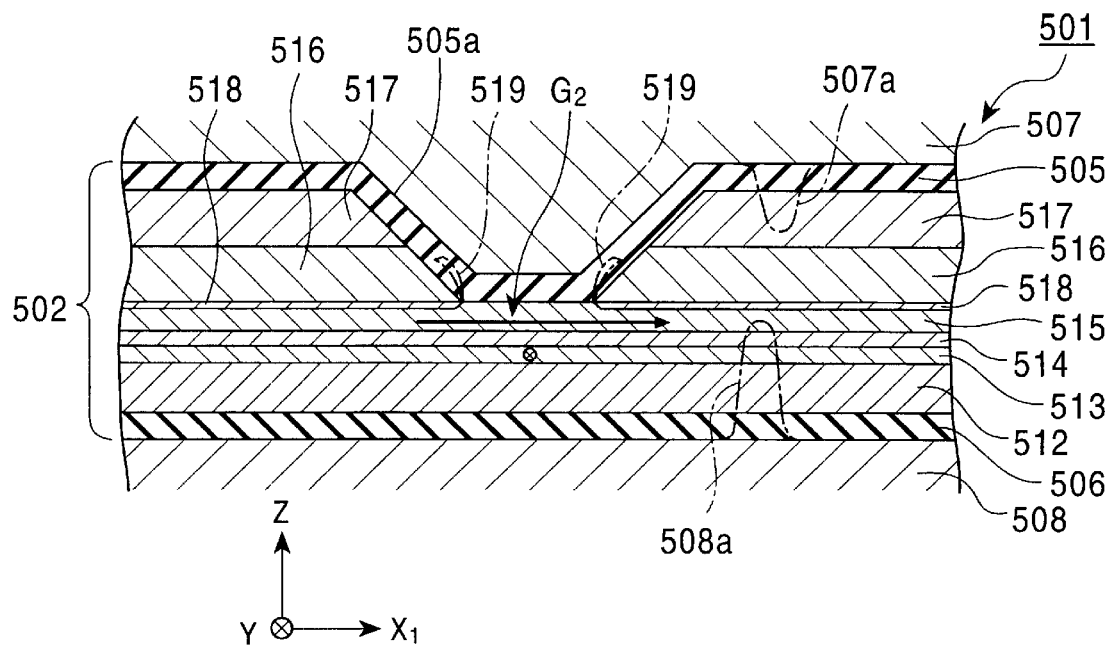
FIG. 31 is a sectional view of a conventional thin film magnetic head according to the prior art, as viewed from the medium-facing surface side.
Figure 32:
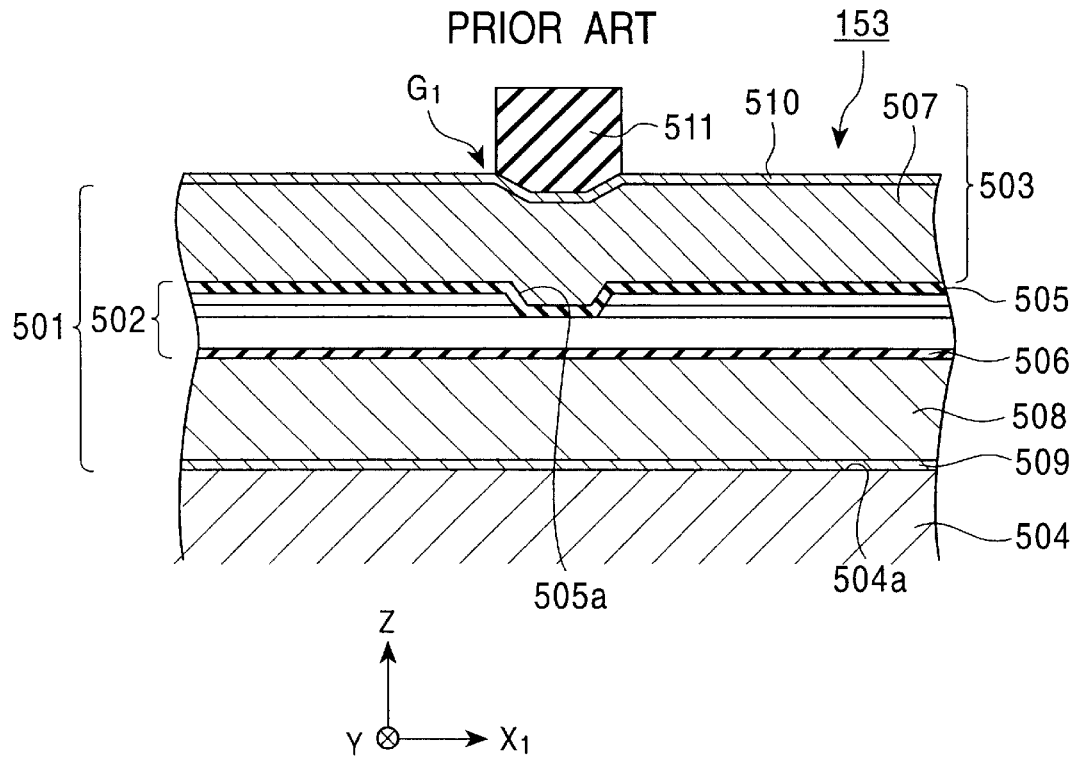
FIG. 32 is a sectional view of a principal portion of a floating magnetic head comprising the conventional thin film magnetic head shown in FIG. 31, as viewed from the medium-facing surface side.

FIG. 30 is a sectional view of a thin film magnetic head 233 in accordance with a twelfth embodiment of the present invention. In FIG. 30, the same components as those shown in FIGS. 1 to 4 are denoted by the same reference numerals. The description of these components is brief or omitted.

As shown in FIG. 30, like the above-mentioned thin film magnetic head 3, the thin film magnetic head 223 constitutes a floating magnetic head together with the inductive head 4 (see FIG. 4). The thin film magnetic head 233 comprises a spin-valve thin film magnetic element 234, and an upper shield layer 13 and a lower shield layer 12 laminated on both sides of the spin-valve thin film magnetic element 234 in the direction of the thickness thereof.

As shown in FIG. 30, a projection 12a is provided in the lower shield layer 12 to project toward the spin-valve thin film magnetic element 234 side. A projection 13a is provided in the upper shield layer 13 to project toward the spin-valve thin film magnetic element 234 side.

In FIG. 30, the Z direction is the movement direction of the magnetic recording medium. The Y direction is the direction of a leakage magnetic field from the magnetic recording medium. The X1 direction of the direction of the track width of the thin film magnetic head 233.

The spin-valve thin film magnetic element 234 is a dual spin-valve thin film magnetic element in which a nonmagnetic conductive layer, a pinned magnetic layer and an antiferromagnetic layer are laminated on either side of a free magnetic layer in the direction of the thickness.

In the spin-valve thin film magnetic element 234, an insulating layer 241, an antiferromagnetic layer 245, a pinned magnetic layer 244, and a nonmagnetic conductive layer 243 are laminated on the projection 12a of the lower shield layer 12. A pair of interlayer insulating layers 241, and a pair of conductive layers 256 are laminated on both sides of the projection 12a, the insulating layer 241, the antiferromagnetic layer 245, the pinned magnetic layer 244, and the nonmagnetic conductive layer 243 in the X1 direction shown in FIG. 30 (on both sides in the direction of the track width).

The interlayer insulating layers 241 are extended on the inclined surfaces of the projection 12a to contact the insulating layer 241.

Each of the insulating layer 241, the antiferromagnetic layer 245, the pinned magnetic layer 244, and the nonmagnetic conductive layer 243 has a substantially trapezoidal sectional shape.

The conductive layers 256 are laminated until the upper surfaces 256a (layer surfaces) and the upper surface (layer surface) 243a of the nonmagnetic conductive layer 243 form the same plane.

The pair of the conductive layers 256 are arranged on both sides of the projection 12a of the lower shield layer 12 in the X1 direction shown in the drawing so that the conductive layers 256 are partly buried in the lower shield layer 12.

A free magnetic layer 242 is laminated on the conductive layers 256 and the nonmagnetic conductive layer 243.

A nonmagnetic conductive layer 263, a pinned magnetic layer 264, an antiferromagnetic layer 265, and an insulating layer 257 are laminated in turn on the free magnetic layer 242. Each of these layers 263, 264, 265, and 257 has a substantially trapezoidal sectional shape.

Furthermore, a pair of insulating bias layers 258 are arranged on both sides of the nonmagnetic conductive layers 263, the pinned magnetic layers 264, the antiferromagnetic layer 265, and the insulating layer 257 in the X1 direction.

In addition, the upper shield layer 13 is laminated on the insulating bias layers 258 and the insulating layer 257.

The insulating layer 257 and the projection 13a of the upper shield layer 13 are located between the pair of the insulating bias layers 258. The insulating bias layers 258 are located on both sides of the projection 13a in the direction of the track width and buried in the upper shield layer 13.

The insulating bias layers 258 are made of a material equivalent to the above-described insulating bias layers 28, and are brought into contact with the free magnetic layer 242 so that an exchange coupling magnetic field (exchange anisotropic magnetic field) is exhibited in each of the interfaces between the insulating bias layers 258 and the free magnetic layer 242. Therefore, the magnetization direction of the free magnetic layer 242 is oriented in the X1 direction shown in the drawing by the exchange coupling magnetic field.

The antiferromagnetic layers 245 and 265 are made of a material equivalent to the above-described antiferromagnetic layer 25, and brought into contact with the pinned magnetic layers 244 and 264, respectively, to exhibit the exchange coupling magnetic field (exchange anisotropic magnetic field) in each of the interfaces between the pinned magnetic layers 244 and 264 and the antiferromagnetic layers 245 and 265 so that the magnetization direction of each of the pinned magnetic layers 244 and 264 is pinned in the Y direction shown in the drawing.

As a result, the magnetization direction of the free magnetic layer 242 crosses the magnetization direction of each of the pinned magnetic layers 244 and 264.

The free magnetic layer 242, the pinned magnetic layers 244 and 264, the nonmagnetic conductive layers 243 and 263, and the conductive layers 256 are made of materials equivalent to those of the above-described free magnetic layer 22, pinned magnetic layer 24, nonmagnetic conductive layer 23 and conductive layers 26, respectively.

The thin film magnetic head 233 is manufactured by a method similar to the method of manufacturing as the thin film magnetic head 223 of the eleventh embodiment.

The method of manufacturing the thin film magnetic head 233 is mainly different from the method of manufacturing the thin film magnetic head 223 of the eleventh embodiment in that the conductive layers 256 are laminated after both sides of a lift-off resist are etched to form the projection 12a. The free magnetic layer 242, the nonmagnetic conductive layer 263, the pinned magnetic layer 264, the thin film magnetic head 265, and the insulating layer 257 are laminated in turn. A lift-off resist is formed on the insulating layer 257, and the insulating bias layers 258 are laminated after both sides of the lift-off resist are etched.

Namely, the insulating layer 241, the antiferromagnetic layer 245, the pinned magnetic layer 244, and the nonmagnetic conductive layer 243 are laminated in turn on the lower shield layer 12. A lift-off resist is formed on the nonmagnetic conductive layer 243. Both sides of the lift-off resist in the direction of the track width are etched to form the projection 12a in the lower shield layer 12, and to form the insulating layer 241, the antiferromagnetic layer 245, the pinned magnetic layer 244, and the nonmagnetic conductive layer 243 in a substantially trapezoidal sectional shape.

Next, the interlayer insulating layers 241, and the conductive layers 256 are laminated in turn on the portions of the lower shield layer, which are exposed by etching, and the lift-off resist. The lift-off resist is removed.

Then, the free magnetic layer 242, the nonmagnetic conductive layer 263, the pinned magnetic layer 264, the antiferromagnetic layer 265 and the insulating layer 257 are laminated. A lift-off resist is formed on the insulating layer 257. Both sides of the lift-off resist in the direction of the track width are etched to form the nonmagnetic conductive layer 263, the pinned magnetic layer 264, the antiferromagnetic layer 265 and the insulating layer 257 in a substantially trapezoidal sectional shape.

Then, the insulating bias layers 258 are further laminated on both sides of the lift-off resist. The lift-off resist is removed. Then, the upper shield layer 13 is laminated to obtain the thin film magnetic head 233.

In the thin film magnetic head 233, the pair of the insulating bias layers 258 are partly buried in the upper shield layer 13. The conductive layers 256 are buried in the lower shield layer 12. Therefore, the spin-valve thin film magnetic element 234 can be thinned to be made adaptable to a higher magnetic recording density.

Furthermore, in the thin film magnetic head 233, since the pair of the insulating bias layers 258 are arranged on both sides of the nonmagnetic conductive layer 263, the pinned magnetic layer 264, and the antiferromagnetic layer 265 and the insulating layer 257. The spin-valve thin film magnetic element 234 can be thinned. The gap of the thin film magnetic head 233 can be narrowed to make the thin film magnetic head 233 adaptable to a higher magnetic recording density.

Furthermore, insulating bias layers 258 are arranged between the upper shield layer 13 and the free magnetic layer 242. When the upper shield layer 13 is partly extended to cause a sag during polishing of the medium-facing surface to determine the gap depth, there is low probability that the sag reaches the free magnetic layer 242 across the insulating bias layers 258, thereby decreasing the probability of a short circuit between the upper shield layer 13 and the spin-valve thin film magnetic element 234.

In addition, the pair of the insulating bias layers 258 are partly buried in the upper shield layer 13. When the spin-valve thin film magnetic element 234 is thinned to narrow the gap with an increase in the magnetic recording density, the insulating bias layers 258 need not be thinned. Therefore, the magnetization direction of the free magnetic layer 242 can be securely oriented in one direction.

As described above, in the thin film magnetic head of the present invention, a projection is formed on one of the shield layers to project toward the spin-valve thin film magnetic element side. A pair of insulating bias layers are arranged on both sides of the projection in the direction of the track width. Therefore, the pair of the insulating bias layers are partly or wholly buried in the one of the shield layers. Thus, a step produced in the side of the spin-valve thin film magnetic element, which contacts the other shield layer, can be decreased to prevent the propagation of the step to the other shield layer.

For example, even when a gap layer and an upper core layer are laminated on the other shield layer to form an inductive head, no step occurs in the gap layer, thereby preventing the shape of a write magnetic gap G1 from being warped.

In addition, the pair of insulating bias layers are partly or wholly buried in one of the shield layers. When the spin-valve thin film magnetic element is thinned to narrow the gap with increases in magnetic recording density, the insulating layers need not be thinned. The magnetization direction of the free magnetic layer can be securely oriented in one direction, thereby decreasing Barkhausen noise.

Furthermore, the insulating bias layers having high insulation are laminated on one of the shielding layers. When one of the shield layers is partially extended to cause a sag during polishing of the medium-facing surface for determining the gap depth, there is the low probability that the sag reaches the free magnetic layer across the insulating bias layers, thereby decreasing the probability of a short circuit between one of the shield layers and the spin-valve thin film magnetic element.

Furthermore, the thin film magnetic head of the present invention comprises a pair of ferromagnetic layers which are located on both sides of the free magnetic layer in the direction of the track width. The ferromagnetic layers are laminated on the pair of the insulating bias layers to exhibit the exchange anisotropic magnetic field. The magnetization direction of the free magnetic layer is oriented by the exchange anisotropic magnetic field. In manufacturing the thin film magnetic head, the insulating bias layers and the ferromagnetic layers are laminated in turn, thereby preventing impurity contamination of the interfaces therebetween. Also, the great exchange coupling magnetic field is exhibited in the interfaces between the insulating bias layers and the ferromagnetic layers. The magnetization direction of the free magnetic layer can be securely oriented in the direction of the track width by the exchange coupling magnetic field, thereby further increasing the sensitivity of the thin film magnetic head.

In addition, the insulating bias layers are provided between one of the shield layers and the ferromagnetic layers. When one of the shielding layers is partially extended to cause a sag during polishing of the medium-facing surface for determining the gap depth, there is low probability that the sag reaches the ferromagnetic layers across the insulating bias layers, thereby decreasing the probability of a short circuit between one of the shield layers and the spin-valve thin film magnetic element.

Furthermore, in the thin film magnetic head of the present invention, another projection is formed in the other shield layer to project toward the spin-valve thin film magnetic element side. Another insulating layer is laminated so that the pair of the conductive layers are provided on both sides of the other projection in the direction of the track width. Therefore, the pair of the conductive layers are partly or wholly buried in the other shield layer. Thus, even when the spin-valve thin film magnetic element is thinned to narrow the gap with increases in magnetic recording density, the conductive layers need not be thinned. The sensing current can be efficiently supplied to the free magnetic layer.

In the thin film magnetic head of the present invention, the pair of the conductive layers are spaced in the direction of the track width in contact with the free magnetic layer so that the sensing current can be efficiently supplied to the free magnetic layer, thereby further increasing the sensitivity of the thin film magnetic head.

What is claimed is:

1. A thin film magnetic head comprising:
    a spin-valve thin film magnetic element comprising a lamination of a free magnetic layer, a nonmagnetic conductive layer, a pinned magnetic layer, an antiferromagnetic layer for pinning the magnetization direction of the pinned magnetic layer, a pair of conductive layers for supplying a sensing current to the free magnetic layer, and a pair of insulating bias layers to orient the magnetization direction of the free magnetic layer; and
    first and second shield layers laminated on both sides of the spin-valve thin film magnetic element in the direction of the thickness thereof;
    wherein a first projection is formed on the first shield layer to project toward the spin-valve thin film magnetic element side, wherein the pair of insulating bias layers are arranged on both sides of the first projection in the direction of the track width, and wherein the pair of conductive layers are disposed on both sides of the free magnet layer in the track width direction on the second shield layer side.

2. A thin film magnetic head according to claim 1, further comprising a pair of ferromagnetic layers located on at least both sides of the free magnetic layer in the direction of the track width, the ferromagnetic layers laminated on the pair of the insulating bias layers to exhibit an exchange anisotropic magnetic field, wherein the magnetization direction of the free magnetic layer is oriented by the exchange anisotropic magnetic field.

3. A thin film magnetic head according to claim 1, wherein a second projection is formed on the second shield layer to project toward the spin-valve thin film magnetic element side, wherein the pair of the conductive layers are provided on both sides of the second projection in the direction of the track width.

4. A thin film magnetic head according to claim 1, wherein the pair of the conductive layers are spaced in the direction of the track width in contact with the free magnetic layer.

5. A thin film magnetic head according to claim 1,
    wherein the spin-valve thin film magnetic element comprises a nonmagnetic conductive layer, a pinned magnetic layer, and an antiferromagnetic layer, which are laminated on either side of a free magnetic layer in the thickness direction thereof, a pair of conductive layers for supplying a sensing current to the free magnetic layer, and a pair of insulating bias layers for orienting the magnetization direction of the free magnetic layer.

6. A thin film magnetic head according to claim 5, further comprising a pair of ferromagnetic layers located on at least both sides of the free magnetic layer in the direction of the track width, the ferromagnetic layers laminated on the pair of the insulating bias layers to exhibit an exchange anisotropic magnetic field, wherein the magnetization direction of the free magnetic layer is oriented by the exchange anisotropic magnetic field.

7. A thin film magnetic head according to claim 5, wherein a second projection is formed on the second shield layer to project toward the spin-valve thin film magnetic element side, wherein the pair of the conductive layers are provided on both sides of the second projection in the direction of the track width.

* * * * *